(12) United States Patent
Akasaka

(10) Patent No.: US 8,229,592 B2
(45) Date of Patent: Jul. 24, 2012

(54) DEVICE AND METHOD FOR PRESSURE CONTROL OF ELECTRIC INJECTION MOLDING MACHINE

(76) Inventor: Noriyuki Akasaka, Kuwana (JP)

(*) Notice: Subject to any disclaimer, the term of this patent is extended or adjusted under 35 U.S.C. 154(b) by 0 days.

(21) Appl. No.: 13/121,192

(22) PCT Filed: Jan. 12, 2010

(86) PCT No.: PCT/JP2010/050228
§ 371 (c)(1),
(2), (4) Date: Mar. 28, 2011

(87) PCT Pub. No.: WO2010/134359
PCT Pub. Date: Nov. 25, 2010

(65) Prior Publication Data
US 2011/0175248 A1 Jul. 21, 2011

(30) Foreign Application Priority Data
May 18, 2009 (JP) .................. 2009-119743

(51) Int. Cl.
*B29C 45/00* (2006.01)
*B29C 45/17* (2006.01)
*B29C 47/92* (2006.01)
*B29B 17/00* (2006.01)
*B28B 3/06* (2006.01)
*G01B 15/00* (2006.01)

(52) U.S. Cl. .................. 700/200; 264/37.27; 264/37.33; 264/40.3; 264/40.7; 264/297.2; 264/412; 264/654; 264/513

(58) Field of Classification Search ............... 264/37.27, 264/37.33, 40.3, 40.5, 40.7, 297.2, 412, 645, 264/513; 700/200
See application file for complete search history.

(56) References Cited

U.S. PATENT DOCUMENTS

| 3,937,776 A | * | 2/1976 | Hold et al. | 264/40.4 |
| 4,066,725 A | * | 1/1978 | Boettner | 264/40.5 |
| 4,759,705 A | * | 7/1988 | Otake et al. | 425/145 |
| 5,158,783 A | * | 10/1992 | Inaba et al. | 425/145 |

(Continued)

FOREIGN PATENT DOCUMENTS

JP 5-77298 A 3/1993

(Continued)

OTHER PUBLICATIONS

Akasaka-N.,"A Synchronous Position Control Method at Pressure Control between Multi-AC Servomotors Driven in Injection Molding Machine" 2003, SICE Annual Conference in Fukui, Fukui University, p. 334-340.*

(Continued)

*Primary Examiner* — Charles Kasenge
*Assistant Examiner* — Thomas Stevens

(57) ABSTRACT

The present invention uses a high-gain observer which contains the discrete-time arithmetic expressions derived from a mathematical model of an injection and pressure application mechanism in an electric-motor driven injection molding machine consisting of state equations and outputs an estimate of injection pressure, which is one of the state variables of the above state equations, by using a screw position signal and a servomotor current demand signal or actual motor current signal as inputs. The high-gain observer obtains the exact injection pressure estimate with very small time-lag without using a pressure detector. Thus the estimate of injection pressure fed by the high-gain observer can be adopted as a feedback signal of actual injection pressure for controlling injection pressure.

3 Claims, 8 Drawing Sheets

U.S. PATENT DOCUMENTS

| | | | | |
|---|---|---|---|---|
| 5,362,222 A | * | 11/1994 | Faig et al. | 425/145 |
| 6,146,575 A | * | 11/2000 | Huston | 264/349 |
| 6,695,994 B2 | | 2/2004 | Bulgrin et al. | |
| 2002/0160076 A1 | * | 10/2002 | Kubota et al. | 425/574 |

FOREIGN PATENT DOCUMENTS

| | | | |
|---|---|---|---|
| JP | 6-856 | A | 1/1994 |
| JP | 6055599 | A | 3/1994 |
| JP | 7-299849 | A | 11/1995 |
| JP | 9-277325 | A | 10/1997 |
| JP | 10-44206 | A | 2/1998 |
| JP | 10-244571 | A | 9/1998 |
| JP | 2000202875 | A | 7/2000 |
| JP | 2003-211514 | A | 7/2003 |
| JP | 3741150 | B | 2/2006 |
| JP | 2006-142659 | A | 6/2006 |
| JP | 3787627 | B | 6/2006 |
| JP | 2006-256067 | A | 9/2006 |
| JP | 2006256067 | A | 9/2006 |
| JP | 2008-265052 | A | 11/2008 |
| JP | 4589460 | B | 12/2010 |

OTHER PUBLICATIONS

Akasaka-N., "Synchronous Positioning Control in Pressure Control Among Multi-AC Servomotors in Injection Molding Machine", Journal of Robotics and Mechatronics, 2004, p. 348-354, vol. 16, No. 4, Fuji Technology Press Ltd., Tokyo, Japan.

\* cited by examiner

{Fig. 1}
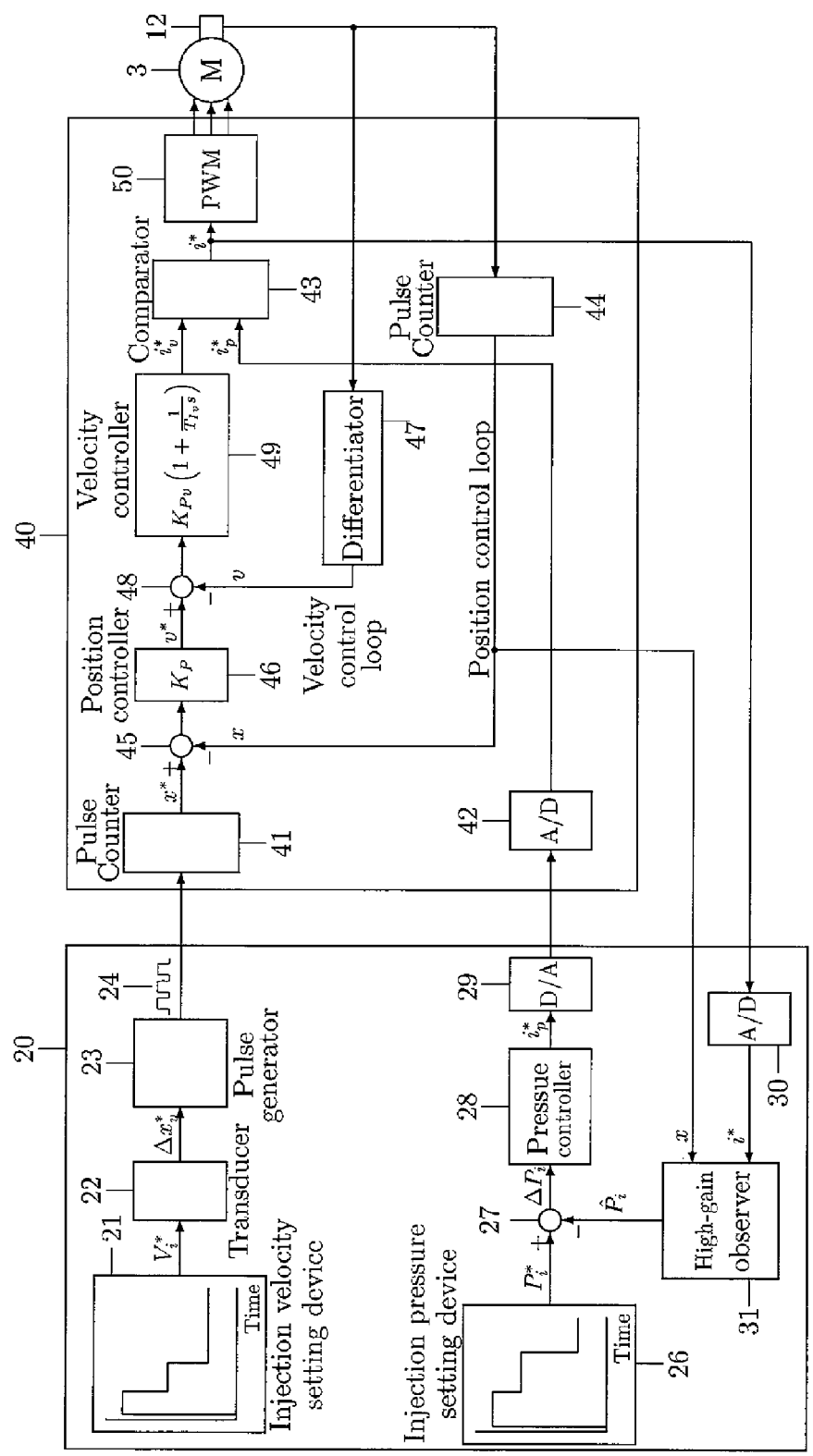

{Fig. 2}
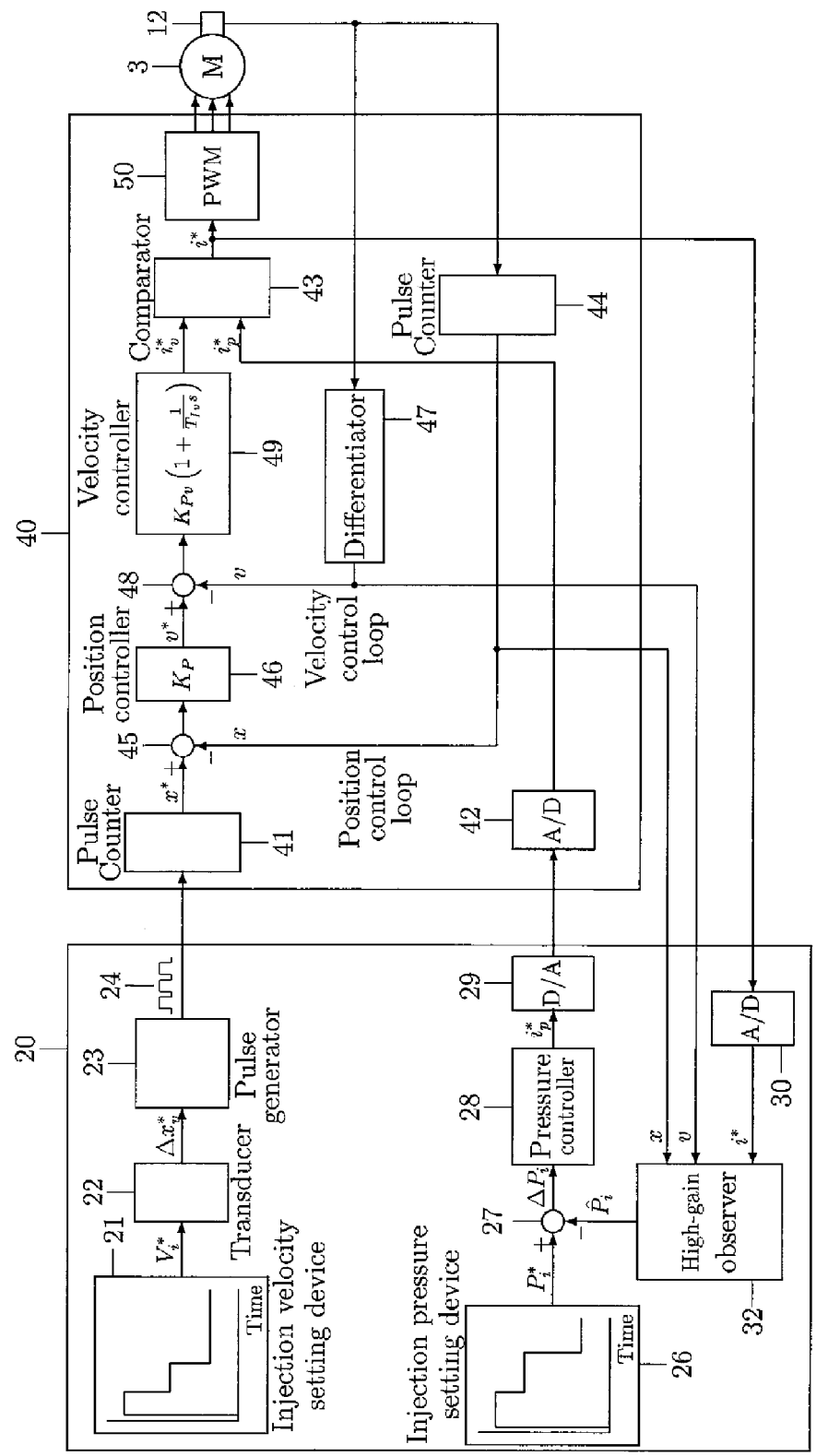

{Fig. 3}
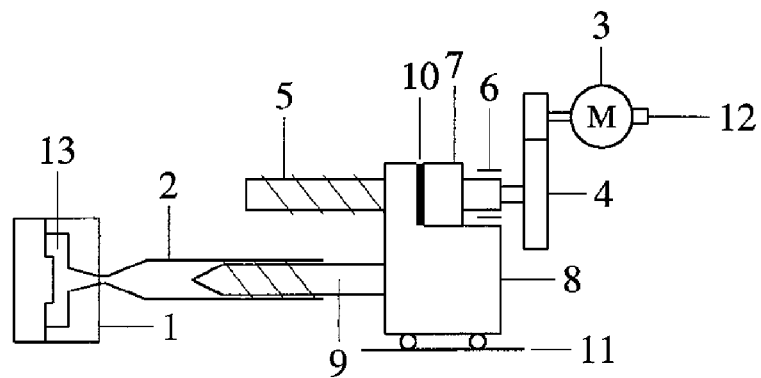
{Fig. 4}
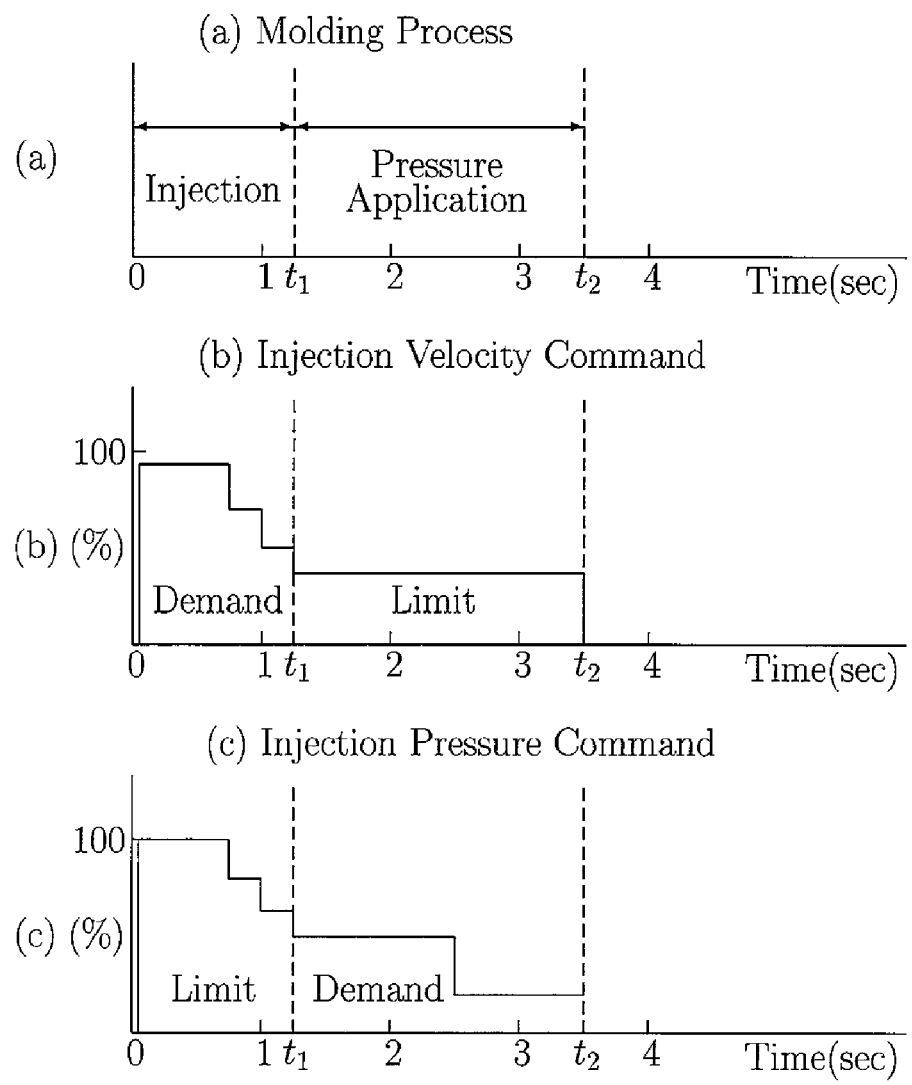

{Fig. 5}
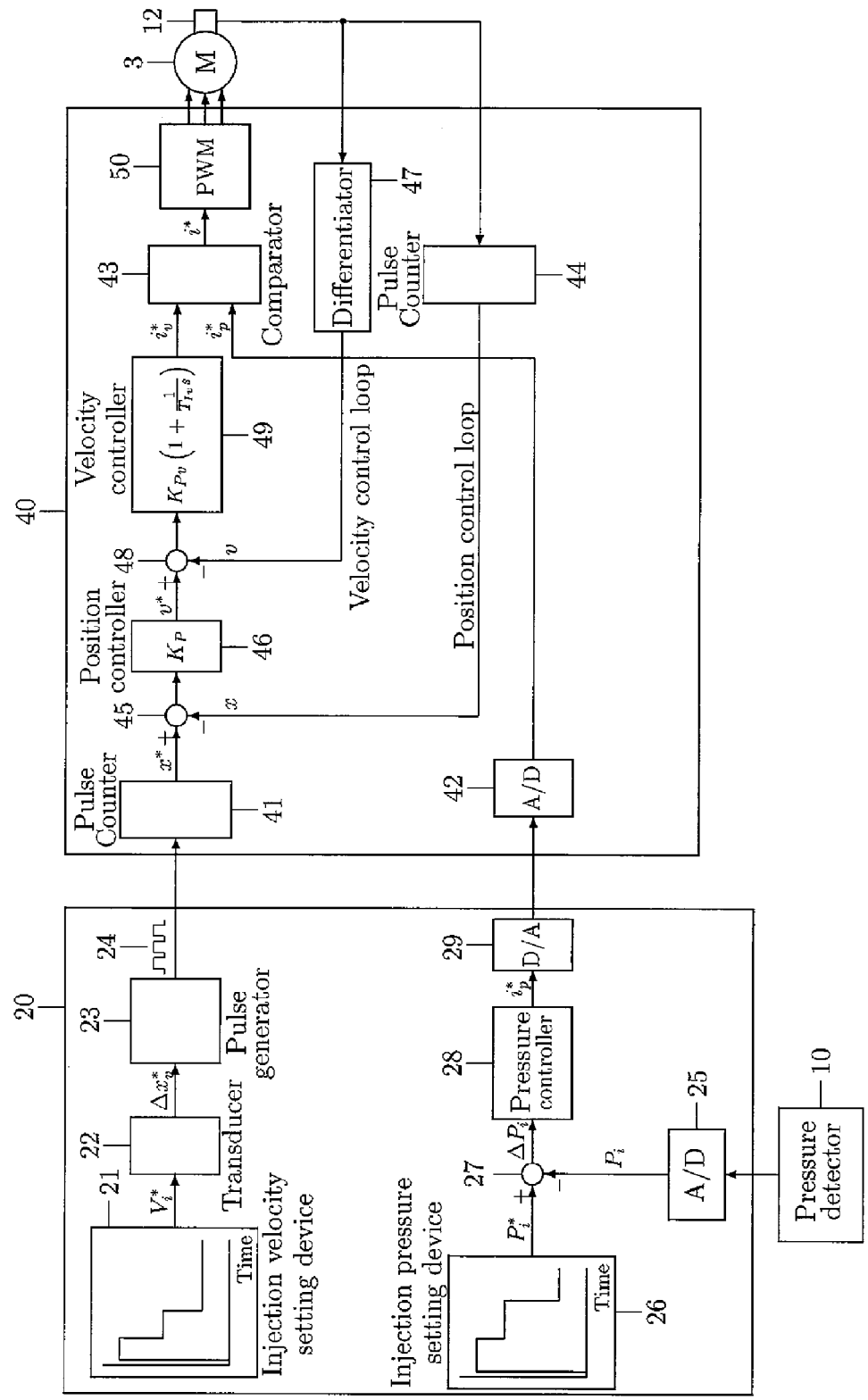

{Fig. 6}
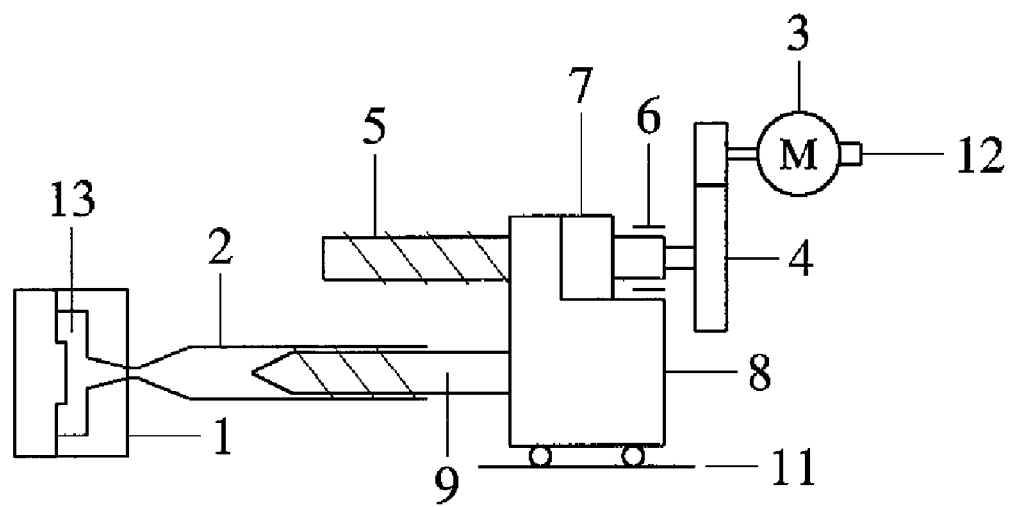

{Fig. 7}
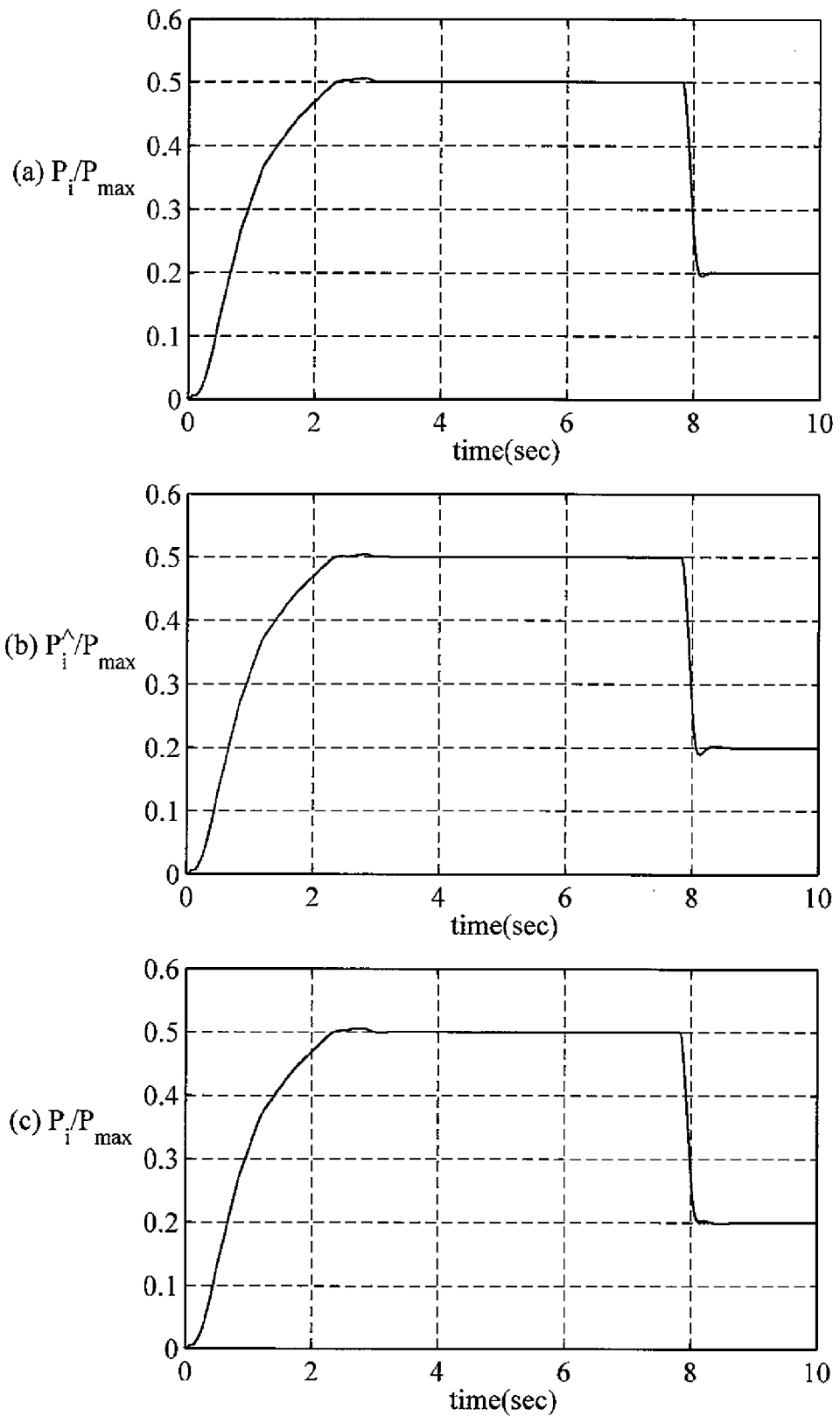

{Fig. 8}
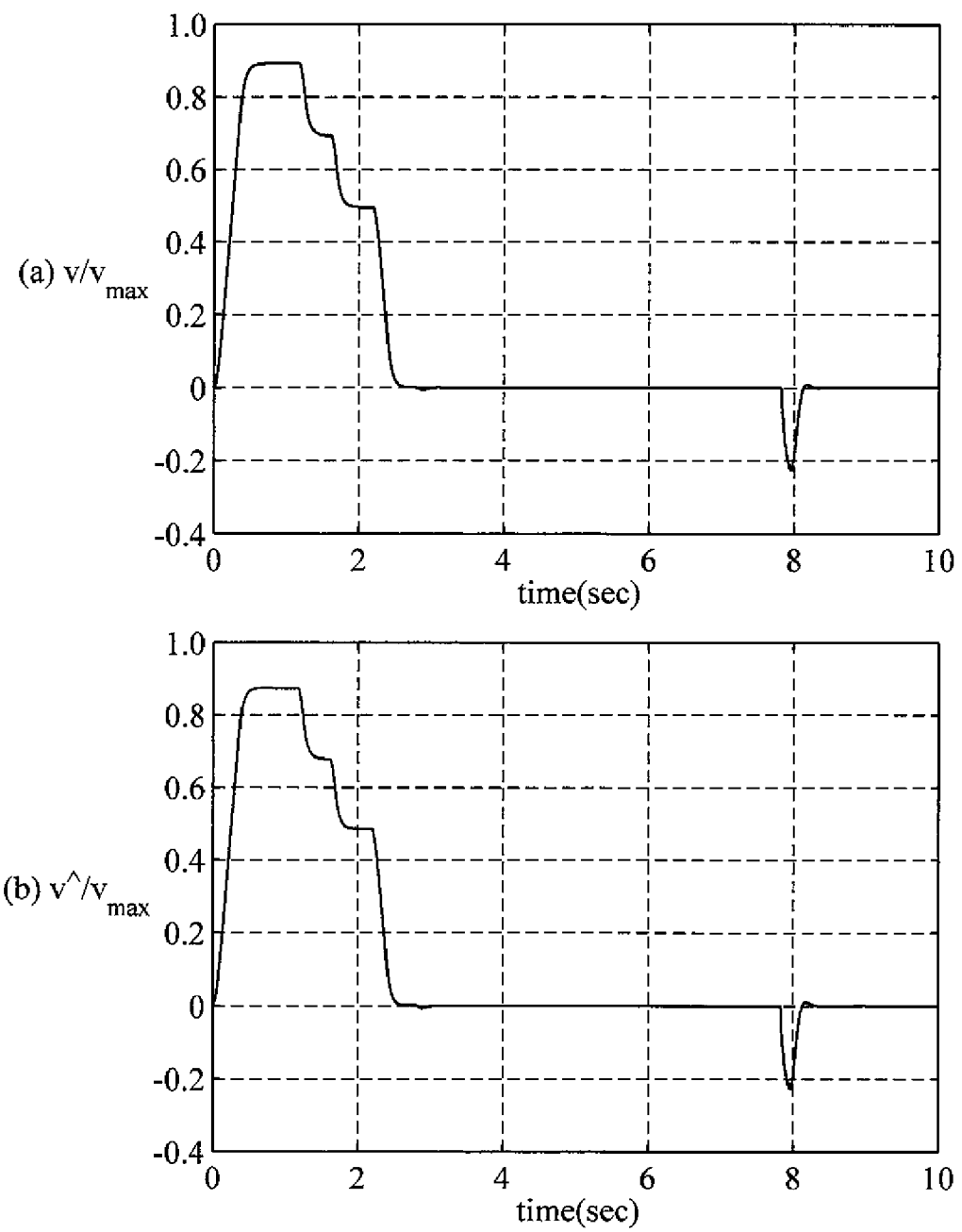

{Fig. 9}
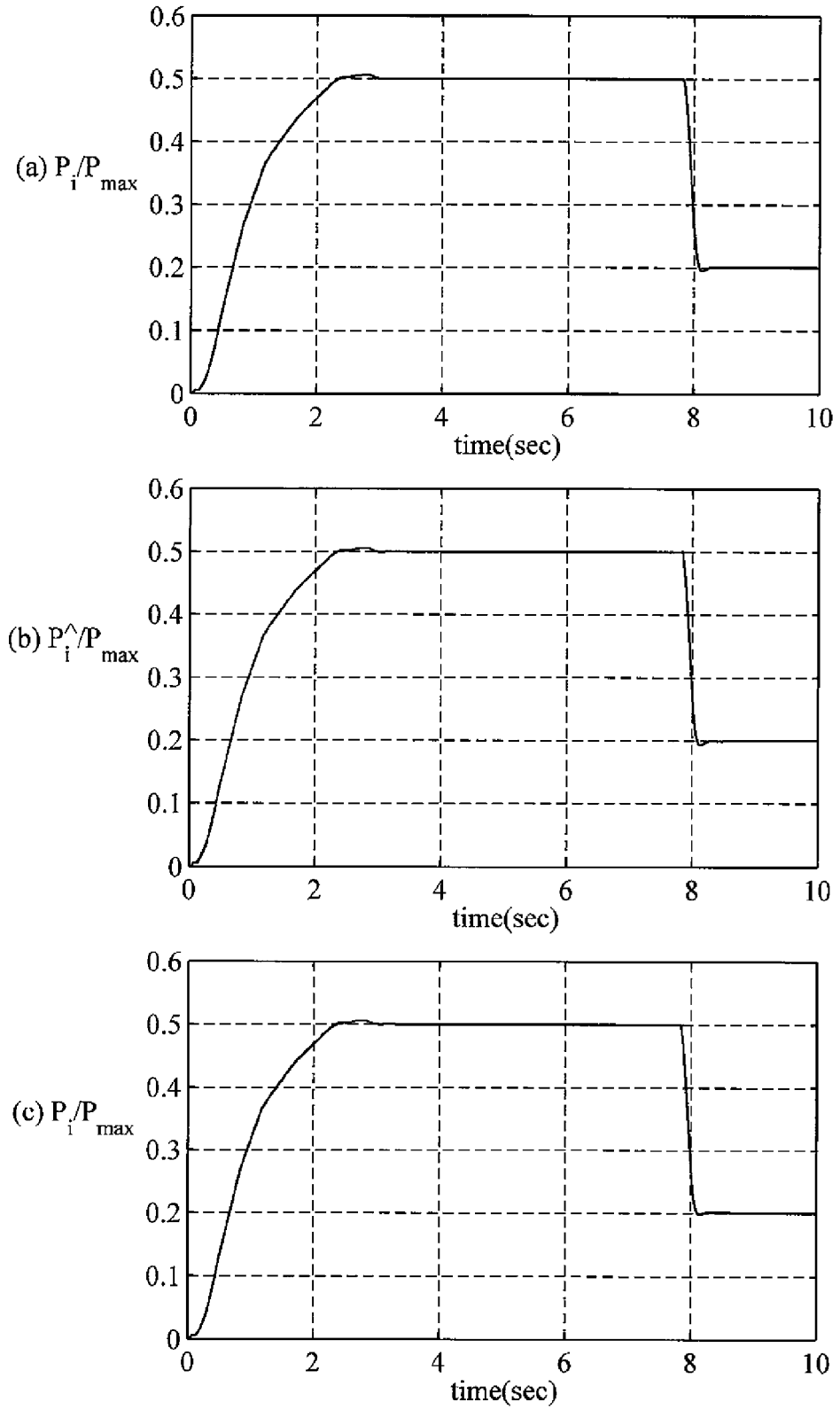

DEVICE AND METHOD FOR PRESSURE CONTROL OF ELECTRIC INJECTION MOLDING MACHINE

TECHNICAL FIELD

This invention is concerning an apparatus and a method for controlling pressure in an electric-motor driven injection molding machine.

BACKGROUND ART

AC servomotors are becoming used for middle-sized injection molding machines heretofore driven by hydraulic actuators (clamping force>3.5 MN) that have high precision, quick response and higher power which are obtained by performance improvements of permanent magnets and cost reductions.

An injection molding machine consists of a plasticizier in which resin pellets are melted by friction heat generated by plasticizing screw revolution and stored at the end of a barrel, an injector in which an amount of melted polymer is injected into a metal mold at a given velocity and a given dwell pressure is applied, and a clamper in which the metal mold is clamped and opened, all using AC servomotors drive system. FIG. 3 shows a view of an injection molding mechanism using an AC servomotor.

On an injection machine base which is fixed on the ground, a movable base is located which moves on a linear slider and both the bases are not shown in FIG. 3. All parts except a metal mold 1 shown in FIG. 3 are mounted on the movable base. By sliding the movable base, the top of a barrel 2 is clamped on the metal mold 1 and vice versa the top of the barrel 2 is separated from the metal mold 1. FIG. 3 shows a mode in which the top of the barrel 2 is clamped on the metal mold 1 before melted polymer being injected into the metal mold 1.

On the movable base, a servomotor 3, a reduction gear 4, a ball screw 5 and a bearing 6 are fixed. A nut 7 of the ball screw 5, a moving part 8, a screw 9 and a pressure detector 10 such as a load cell consist of an integral structure. The moving part 8 is mounted on a linear slider 11 so that the integral structure is moved back and forth by the movement of the nut 7.

Rotation of the servomotor 3 is transferred to the ball screw 5 which magnifies linear force through the reduction gear 4 and rotation of the ball screw 5 is converted to a linear motion of the nut 7 of the ball screw 5 and a linear motion of the screw 9 and pressure application to melted polymer are realized through the moving part 8. Position of the screw 9 is detected by a rotary encoder 12 mounted on the servomotor 3. Pressure applied to the melted polymer at the end of the barrel 2 is detected by the pressure detector 10 mounted between the nut 7 and the moving part 8. A cavity 13 in the metal mold 1 is filled up with melted polymer by a movement of the screw 9.

Manufacturing a molding product consists of injection and dwell pressure application. In the injection process, polymer melt must be injected into the cavity 13 as fast as possible so that temperatures of polymer in the cavity become homogeneous. However, as excessive injection velocity brings about excessive polymer pressure and molding defects, polymer pressure in the injection process is constrained under a given pressure limit pattern. In the pressure application process following the injection process, a given pressure pattern is applied for each given duration at the polymer in the cavity during cooling in order to supply a deficiency due to polymer shrinkage. Therefore, the following two requirements are given to the injection velocity pattern and the pressure application pattern.

(1) In the injection process, a given injection velocity pattern is realized and at the same time injection pressure is constrained under a given pressure limit pattern in terms of molding quality.

(2) In the pressure application process, a given pressure pattern is realized and at the same time injection velocity is constrained under a given velocity limit pattern in terms of safety operation.

In the injection process (time $0 \sim t_1$) shown in FIG. 4(a), injection velocity control is carried out by giving injection velocity command shown in FIG. 4(b) to realize a given injection velocity pattern. However, injection pressure has to be controlled lower than a given pressure limit pattern shown in FIG. 4(c). Vertical scales 100% shown in FIG. 4(b) and (c) indicate maximum values of injection velocity and injection pressure, respectively.

In the pressure application process (time $t_1 \sim t_2$) shown in FIG. 4(a), pressure application control is carried out by giving pressure application command shown in FIG. 4(c) to realize a given pressure application pattern. However, injection velocity has to be controlled lower than a given injection velocity limit pattern shown in FIG. 4(b).

FIG. 5 shows a block diagram of a controller which realizes the above two requirements (1) and (2) (patent literature Japanese Patent 3,787,627). The controller consists of an injection controller 20 and a motor controller (servoamplifier) 40.

The injection controller 20 executes a control algorithm at a constant time interval $\Delta t$ and a discrete-time control is used. The injection controller 20 consists of an injection velocity setting device 21, a transducer 22, a pulse generator 23, an analog/digital (A/D) converter 25, an injection pressure setting device 26, a subtractor 27, a pressure controller 28, and a digital/analog (D/A) converter 29. The pressure detector 10 is connected to the injection controller 20.

The injection velocity setting device 21 feeds a time sequence of injection velocity command $V^*_i$ to the transducer 22. The transducer 22 calculates screw displacement command $\Delta x^*_v$ for the screw 9 which has to move during the time interval $\Delta t$ by the following equation (1).

{Math. 1}

$$\Delta x^*_v = V^*_i \Delta t \tag{1}$$

The command $\Delta x^*_v$ is fed to the pulse generator 23.

The pulse generator 23 feeds a pulse train 24 corresponding to the command $\Delta x^*_v$. The pulse train 24 is fed to a pulse counter 41 in the motor controller 40.

The pressure detector 10 feeds an injection pressure signal $P_i$ to the injection controller 20 through the A/D converter 25. The A/D converter 25 feeds the pressure signal $P_i$ to the subtractor 27.

The injection pressure setting device 26 feeds a time sequence of injection pressure command $P^*_i$ to the subtractor 27. The subtractor 27 calculates a pressure control deviation $\Delta P_i$ by the following equation (2).

{Math. 2}

$$\Delta P_i = P^*_i - P_i \tag{2}$$

The control deviation $\Delta P_i$ is fed to the pressure controller 28.

The pressure controller 28 calculates a motor current demand $i^*_p$ from $\Delta P_i$ by using PID (Proportional+Integral+Derivative) control algorithm and feeds the demand $i^*_p$ to the motor controller 40 through the D/A converter 29.

The motor controller 40 consists of pulse counters 41 and 44, an A/D converter 42, a comparator 43, subtractors 45 and 48, a position controller 46, a differentiator 47, a velocity controller 49 and a PWM (Pulse Width Modulation) device 50. The motor controller 40 is connected to the servomotor 3 equipped with the rotary encoder 12. The demand $i^*_p$ is fed to the comparator 43 through the A/D converter 42.

The pulse counter 41 accumulates the pulse train 24 from the injection controller 20 and obtains screw position demand x* and feeds the demand x* to the subtractor 45. The pulse counter 44 accumulates the pulse train from the rotary encoder 12 and obtains actual screw position x and feeds the position signal x to the subtractor 45.

The subtractor 45 calculates a position control deviation (x*−x) and feeds the position deviation to the position controller 46. The position controller 46 calculates velocity demand v* by the following equation (3) and feeds the demand v* to the subtractor 48.

{Math. 3}

$$v^* = K_p(x^* - x) \qquad (3)$$

where $K_p$ is a proportional gain of the position controller 46.

The rotary encoder 12 feeds a pulse train to the differentiator 47 and to the pulse counter 44. The differentiator 47 detects actual screw velocity v and feeds the velocity signal v to the subtractor 48.

The subtractor 48 calculates a velocity control deviation (v*−v) and feeds the velocity deviation to the velocity controller 49. The velocity controller 49 calculates a motor current demand $i^*_v$ by the following equation (4) and feeds the demand $i^*_v$ to the comparator 43.

{Math. 4}

$$i^*_v = K_{Pv}(v^* - v) + \frac{K_{Pv}}{T_{Iv}} \int (v^* - v) dt \qquad (4)$$

where $K_{Pv}$ and $T_{Iv}$ are a proportional gain and an integral time constant of the velocity controller 49, respectively. In the motor controller 40 a position control loop has a minor loop of velocity control.

The comparator 43 to which both motor current demands $i^*_v$ and $i^*_p$ from the velocity controller 49 and the pressure controller 28, respectively, are fed, selects a lower current demand i* of $i^*_v$ and $i^*_p$ and feeds the lower demand i* to the PWM device 50. The PWM device 50 applies three-phase voltage to the servomotor 3 so that the servomotor 3 is driven by the motor current i*. The comparator 43 restricts motor current demand $i^*_v$ decided by injection velocity control loop to motor current demand $i^*_p$ decided by pressure control loop.

In FIG. 4, transfer time $t_1$ from injection to pressure application is specified by an operator, so the time $t_1$ should coincide with the time at which the cavity is filled up with polymer melt, but it is difficult for an operator to set the time $t_1$ at the exact time. However, it can be shown that the above two requirements (1) and (2) are realized by the comparator 43. Firstly the finishing time $t_1$ of injection process is supposed to be set by an operator before the time at which the cavity 13 is filled up with polymer melt actually. When the time reaches $t_1$ and pressure application process starts, actual pressure $P_i$ is lower than a set value $P^*_i$ because the cavity is not yet filled and motor current demand $i^*_p$ increases so that pressure $P_i$ is increased to the set value $P^*_i$.

If demand $i^*_p$ is selected, injection velocity increases rapidly because the cavity is still filling. Actual velocity could exceed the velocity limit shown in FIG. 4(b), failing requirement (2). Even if demand $i^*_p$ exceeds $i^*_v$ when pressure application starts, however, the comparator 43 selects the lower demand $i^*_v$ and limits velocity so requirement (2) is met, that is, by the comparator 43 pressure application is transferred to velocity limit in order to satisfy requirement (2).

Secondly the time $t_1$ is supposed to be set after the time at which the cavity 13 is filled up actually. Even when the cavity is filled up, injection process continues, but actual screw speed slows as the cavity is filled and motor current demand $i^*_v$ is increased to maintain injection velocity.

If demand $i^*_v$ is selected by the comparator 43, injection pressure increases rapidly because filling is completed and actual pressure may exceed the pressure limit shown in FIG. 4(c), failing requirement (1). Even if demand $i^*_v$ exceeds $i^*_p$ in injection process, however, the comparator 43 selects the lower demand $i^*_p$ and limits pressure control in injection, so requirement (1) is met, that is, by the comparator 43 velocity control is transferred to pressure limit in order to satisfy requirement (1).

In the controller shown in FIG. 5, the pressure detector 10 is absolutely necessary. Patent literatures Japanese Patent Application 5-77298~Japanese Patent Application 2008-265052 are applications of the pressure control apparatus and method of injection molding machines without using the pressure detector.

In patent literature Japanese Patent Application 5-77298 for hydraulic actuator driven injection machines, polymer charateristics formula which gives the relational expression among polymer pressure, polymer temperature and polymer specific volume is used and the required polymer pressure is calculated by inputting measured polymer temperature and polymer specific volume which is decided from the desired value of molding product weight. Then by using initial temperatures of metal mold and polymer at the start of pressure application process and the above required polymer pressure, the required set value of pressure application is derived through an approximate expression. The pressure application set value is fed to the hydraulic servovalve amplifier as the voltage command converted and the set value of applied pressure is realized by the hydraulic pressure of hydraulic cylinder piston.

In patent literature Japanese Patent Application 6-856, in order to detect polymer pressure in the cavity the pressure is applied to a plunger which moves back and forth in the cavity and is connected with a ball screw mechanism whose nut is rotated by a servomotor. In injection and pressure application process the servomotor holds the position of the plunger to which the polymer pressure is applied and the servomotor current is detected by a current transducer and the detected current is converted to the polymer pressure in the cavity. The position of the plunger is detected by a rotary encoder equipped with the servomotor.

In patent literature Japanese Patent Application 7-299849, in order to detect polymer pressure in the cavity a disturbance observer is used for a servomotor drive system which moves a plunger back and forth in the cavity. In injection and pressure application process the pressure is applied to the plunger and the servomotor drive system holds the position of the plunger. Then the disturbance observer estimates load torque of the servomotor by using a motor speed signal and a motor torque command signal. The pressure in the cavity is obtained from the estimated load torque. The arithmetic expressions of the observer are shown in the literature. The method by which pressure in the cavity is obtained directly by using detected servomotor current or motor torque command, is also shown in the literature.

In patent literature Japanese Patent Application 9-277325, firstly a function which estimates polymer pressure in the cavity by using injection screw drive force and injection velocity, is decided. In the actual control actions, feature size of a molding product, polymer data, real-time data of screw drive force and injection velocity are fed to the above function and the real-time estimated pressure in the cavity is obtained. Injection velocity is controlled by deviation of the estimated pressure from the reference value. The procedures of obtaining the above exact function are shown in the literature.

In patent literature Japanese Patent 3,741,150, the pressure control apparatus is realized in which an observer for a servomotor drive system estimates polymer pressure and the estimated pressure is used as a detected signal for the pressure control. The observer is fed by a motor speed in an injection process and the total friction resistance in an injection mechanism and outputs the estimates of motor speed and polymer pressure. The observer is applied to the following two models.
(1) A servomotor drives an injection screw through a linear motion converter such as a ball screw only.
(2) A servomotor drives an injection screw through a belt pulley reduction gear and a linear motion converter.

In the observer model (1), the friction resistance consists of a dynamic friction resistance and a static friction resistance over an injection mechanism. In the observer model (2), the friction resistance consists of a dynamic friction resistance only which is defined as a sum of a velocity dependent component and a load dependent component.

In the observer model (1) the polymer pressure is assumed to be constant. In the observer model (2) the observer outputs not only the estimates of motor speed and polymer pressure but also the estimates of pulley speed at load side, belt tension and force applied to polymer melt by a screw. It is assumed that the belt is elastic and the time rate of change in polymer pressure is proportional to pulley speed at load side, to pulley acceleration and to force applied to polymer by a screw. The force applied to polymer melt by a screw is assumed to be constant.

In patent literature Japanese Patent Application 2006-142659, an injection velocity and pressure control apparatus is realized in which an observer for a servomotor drive system estimates the load torque generated by polymer pressure. The observer is fed by motor speed signal and motor current command signal and outputs the estimates of motor speed, load torque and position difference between a motor shaft and a load side shaft. The model of the observer consists of the servomotor drive system which moves a screw through a belt pulley reduction gear. The pressure value converted from the estimated load torque obtained by the observer is used as a detected pressure signal.

In patent literature Japanese Patent Application 2006-256067, the observer for the model (2) in Japanese Patent 3,741,150 is used and the pressure control method is invented. The method uses motor speed and the estimates of pulley speed at load side, belt tension and polymer pressure as feedback signals of state variables. These estimates are obtained by the observer. Another control method is invented, in which the servomotor torque command is decided by the above four state variables.

In patent literature Japanese Patent Application 2008-265052, a method is invented, in which the estimate of load torque applied by polymer pressure is obtained by using an inverse model of a transfer function whose inputs are motor generated torque and load torque and output is motor speed. The inverse model is fed by motor speed and motor generated torque and derives the estimate of load torque. The polymer pressure is obtained from the estimate of the load torque. The inverse model requires the high-order differentiation.

The common object of inventions described in patent literatures Japanese Patent Application 5-77298~Japanese Patent Application 2008-265052 which detect polymer pressure without using a pressure detector is to avoid the following disadvantages.
(1) A highly reliable pressure detector is very expensive under high pressure circumstances.
(2) Mounting a pressure detector in the cavity or the barrel nozzle part necessitates the troublesome works and the working cost becomes considerable.
(3) Mounting a load cell in an injection shafting alignment from a servomotor to a screw complicates the mechanical structure and degrades the mechanical stiffness of the structure.
(4) A load cell which uses strain gauges as a detection device necessitates an electric protection against noise for weak analog signals. Moreover the works for zero-point and span adjustings of a signal amplifier are necessary (patent literature Japanese Patent Application 2003-211514).

Patent literatures Japanese Patent Application 10-244571 and Japanese Patent Application 10-44206 are inventions concerning the pressure control at electric-motor driven injection molding machines and both necessitate pressure detectors. In patent literature Japanese Patent Application 10-244571, the concept of virtual screw velocity $w_1$ is introduced in equation (1) of the description of Japanese Patent Application 10-244571 and equation (1) is based on the point of view which the pressure control is conducted by screw position control. An exact control method is realized by using virtual velocity $w_1$ as a parameter which compensates the pressure loss due to the nonlinear loss which results in the difference between the pressure corresponding to motor generated torque and pressure set value. The disturbance observer outputs the estimate of virtual velocity $w_1$ so that the difference between the pressure detected by a load cell and the estimated pressure becomes zero by using the error between detected pressure and the estimated pressure. Patent literature Japanese Patent Application 10-44206 is a prior application of Japanese Patent Application 10-244571 and it is different from Japanese Patent Application 10-244571 in the observer structure.

CITATION LIST

Patent Literature

Japanese Patent 3,787,627
Japanese Patent Application 5-77298
Japanese Patent Application 6-856
Japanese Patent Application 7-299849
Japanese Patent Application 9-277325
Japanese Patent 3,741,150
Japanese Patent Application 2006-142659
Japanese Patent Application 2006-256067
Japanese Patent Application 2008-265052
Japanese Patent Application 2003-211514
Japanese Patent Application 10-244571
Japanese Patent Application 10-44206

Non-patent Literature

H. K. Khalil, Nonlinear Systems, 14.5 High-Gain Observers, Prentice-Hall, (2002), pp.610-625

B. D. O. Anderson and J. B. Moore, Optimal Control, Linear Quadratic Methods, 7.2 Deterministic Estimator Design, Prentice-Hall, (1990), pp.168-178

A. M. Dabroom and H. K. Khalil, Discrete-time implementation of high-gain observers for numerical differentiation, Int. J. Control, Vol. 72, No. 17, (1999), pp. 1523-1537

A. M. Dabroom and H. K. Khalil, Output Feedback Sampled-Data Control of Nonlinear Systems Using High-Gain Observers, IEEE Trans. Automat. Contr., Vol. 46, No. 11, (2001), pp.1712-1725

SUMMARY OF INVENTION

Technical Problem

The problem that starts being solved is to realize a pressure control apparatus and a pressure control method of electric-motor driven injection molding machines which satisfy the above two requirements (1) and (2) without using a pressure detector in order to avoid the four disadvantages described in Background Art resulted by using a pressure detector.

Solution to Problem

Manufacturing a molding product consists of injection and dwell pressure application. In the injection process injection pressure has to be constrained under a given pressure limit pattern by the requirement (1) and so it is necessary to detect the actual pressure without time-lag. In the pressure application process a given pressure pattern has to be realized by the requirement (2) and so it is necessary to detect the applied pressure without time-lag. Therefore a pressure detecting means is required to have no time-lag.

As the error of detected pressure causes molding defects and lack of safety operation, the exact pressure detection is required. Therefore the method of a high-gain observer (non-patent literature H. K. Khalil, Nonlinear Systems, 14.5 High-Gain Observers, Prentice-Hall) is used to realize a pressure detecting means which satisfies the following two requirements (A) and (B).

(A) The detection means has very small time-lag.

(B) The detection means is high-precision.

A high-gain observer estimates all state variables by using detected variables. This is explained by using a simple mathematical model as follows. Equation (5) shows a state equation of a simple model.

{Math. 5}

$$\left.\begin{aligned}\dot{x}_1 &= x_2 \\ \dot{x}_2 &= \phi(x, u) \\ y &= x_1 \\ x &= \begin{bmatrix} x_1 \\ x_2 \end{bmatrix}\end{aligned}\right\} \quad (5)$$

where $x_1$, $x_2$: State variables, u: Input variable, y: Output variable, $\Phi(x, u)$: nonlinear function of variables x, u. For example $x_1$ is position variable, $x_2$ is velocity variable and u is motor current variable. Output variable y and input variable u are supposed to be measurable. The high-gain observer which estimates state x is given by equation (6).

{Math. 6}

$$\left.\begin{aligned}\dot{\hat{x}}_1 &= \hat{x}_2 + H_1(y - \hat{x}_1) \\ \dot{\hat{x}}_2 &= \phi_0(\hat{x}, u) + H_2(y - \hat{x}_1)\end{aligned}\right\} \quad (6)$$

where $\hat{x}_1$, $\hat{x}_2$: Estimates of state variables $x_1$, $x_2$, $H_1$, $H_2$: Gain constants of the high-gain observer which are larger than 1, $\Phi_0$: Nominal function of $\Phi$ used in the high-gain observer computing. Estimation errors $\tilde{x}_1$, $\tilde{x}_2$ by using the high-gain observer (6) are given by equation (7) from equations (5) and (6).

{Math. 7}

$$\left.\begin{aligned}\dot{\tilde{x}}_1 &= -H_1\tilde{x}_1 + \tilde{x}_2 \\ \dot{\tilde{x}}_2 &= -H_2\tilde{x}_1 + \delta(x, \hat{x}, u)\end{aligned}\right\} \quad (7)$$

$$\left.\begin{aligned}\tilde{x}_1 &= x_1 - \hat{x}_1 \\ \tilde{x}_2 &= x_2 - \hat{x}_2 \\ \delta(x, \hat{x}, u) &= \phi(x, u) - \phi_0(\hat{x}, u)\end{aligned}\right\} \quad (8)$$

where $\delta$: Model error between the nominal model $\Phi_0$ and the true but actually unobtainable function $\Phi$. Introducing a positive parameter $\epsilon$ much smaller than 1, $H_1$, $H_2$ are given by equation (9).

{Math. 8}

$$H_1 = \frac{K_1}{\varepsilon} \quad H_2 = \frac{K_2}{\varepsilon^2} \quad (9)$$

As $H_1$, $H_2$ in equation (9) are large gain constants, equation (6) is called by a high-gain observer. By using equation (9), equation (7) is rewritten as equation (10).

{Math. 9}

$$\left.\begin{aligned}\dot{\tilde{x}}_1 &= -K_1(\tilde{x}_1/\varepsilon) + \tilde{x}_2 \\ \dot{\tilde{x}}_2 &= -(K_2/\varepsilon)(\tilde{x}_1/\varepsilon) + \delta(x, \tilde{x}, u)\end{aligned}\right\} \quad (10)$$

The estimation errors $\tilde{x}_1$, $\tilde{x}_2$ are replaced by new variables $\eta_1$, $\eta_2$ as written in equation (11).

{Math. 10}

$$\eta_1 = \frac{\tilde{x}_1}{\varepsilon} \quad \eta_2 = \tilde{x}_2 \quad (11)$$

By using equation (11), equation (10) is rewritten as equation (12).

{Math. 11}

$$\left.\begin{aligned}\varepsilon\dot{\eta}_1 &= -K_1\eta_1 + \eta_2 \\ \varepsilon\dot{\eta}_2 &= -K_2\eta_1 + \varepsilon\delta(x, \tilde{x}, u)\end{aligned}\right\} \quad (12)$$

As the parameter $\epsilon$ is much smaller than 1, the effects of model error $\delta$ on the estimation errors $\eta_1$, $\eta_2$ can be made small enough by equation (12). Thus by using the high-gain observer for a model which has injection pressure as a state variable, the above requirement (B) "High-precision detection" for a pressure detecting means is satisfied.

When the effects of the model error $\delta$ on the estimation errors $\eta_1$, $\eta_2$ are neglected, equation (12) is rewritten as equation (13).

{Math. 12}

$$\begin{bmatrix} \dot{\eta}_1 \\ \dot{\eta}_2 \end{bmatrix} = \frac{1}{\varepsilon}\begin{bmatrix} -K_1 & 1 \\ -K_2 & 0 \end{bmatrix}\begin{bmatrix} \eta_1 \\ \eta_2 \end{bmatrix} = \frac{1}{\varepsilon}A\begin{bmatrix} \eta_1 \\ \eta_2 \end{bmatrix} \tag{13}$$

$$A = \begin{bmatrix} -K_1 & 1 \\ -K_2 & 0 \end{bmatrix} \tag{14}$$

When $K_1$, $K_2$ are decided so that conjugate complex eigenvalues $\lambda_1$, $\bar{\lambda}_1$ of matrix A have a negative real part, that is, $\text{Re}(\lambda_1)=\text{Re}(\bar{\lambda}_1)<0$, the estimate errors $\eta_1$, $\eta_2$ are given by equation (15) with initial values $\eta_{10}$, $\eta_{20}$.

{Math. 13}

$$\left.\begin{aligned}\eta_1(t) &= \exp\!\left(\frac{\text{Re}(\lambda_1)}{\varepsilon}t\right)(C_1(t)\eta_{10} + C_2(t)\eta_{20}) \\ \eta_2(t) &= \exp\!\left(\frac{\text{Re}(\lambda_1)}{\varepsilon}t\right)(C_3(t)\eta_{10} + C_4(t)\eta_{20})\end{aligned}\right\} \tag{15}$$

where t: Time variable, $C_1(t){\sim}C_4(t)$: Sinusoidal components with constant amplitudes and constant frequency decided by $K_1$, $K_2$. As $\text{Re}(\lambda_1)<0$ and $\epsilon$ is much smaller than 1, equation (15) reveals that the time responses $\eta_1(t)$, $\eta_2(t)$ of estimation errors tend to zero rapidly. In other words, by using high-gain observer equation (6), the above requirement (A) "Detection with small time-lag" for a pressure detecting means can be satisfied.

Although estimates $\hat{x}_1$, $\hat{x}_2$ of all state variables are obtained by equation (6), it is sufficient to get only the estimate $\hat{x}_2$ because $x_1$ is detected as output y. Then the high-gain observer is given by equation (16).

{Math. 14}

$$\dot{\hat{x}}_2 = -H\hat{x}_2 + H\dot{y} + \Phi_0(\hat{x}_2, y, u) \tag{16}$$

where H: Gain constant of the high-gain observer which is larger than 1. As time-derivative term of output y is included in the right-hand side of equation (16), equation (16) cannot be used as a computing equation by itself. But it can be shown that the high-gain observer by equation (16) satisfies the above two requirements (A) and (B). Equation (17) is given from the third equation in equation (5).

{Math. 15}

$$\dot{y} = \dot{x}_1 = x_2 \tag{17}$$

Equation (18) is given by using equations (16) and (17).
{Math. 16}

$$\dot{\hat{x}}_2 = -H\hat{x}_2 + Hx_2 + \Phi_0(\hat{x}_2, y, u) \tag{18}$$

By using the second equation of equation (5), equation (19) is given from equation (18).

{Math. 17}

$$\dot{\tilde{x}}_2 = -H\tilde{x}_2 + \delta(x, \tilde{x}_2, y, u) \tag{19}$$

$$\left.\begin{aligned}\tilde{x}_2 &= x_2 - \hat{x}_2 \\ \delta(x, \tilde{x}_2, y, u) &= \phi(x, u) - \phi_0(\hat{x}_2, y, u)\end{aligned}\right\} \tag{20}$$

Gain constant H is given by equation (21) by introducing a positive parameter $\epsilon$ much smaller than 1.

{Math. 18}

$$H = \frac{K}{\varepsilon} \quad (K > 0) \tag{21}$$

By using equation (21), equation (19) is rewritten as equation (22).
{Math. 19}

$$\varepsilon\dot{\tilde{x}}_2 = -K\tilde{x}_2 + \varepsilon\delta(x,\tilde{x}_2,y,u) \tag{22}$$

As $\epsilon$ is much smaller than 1, the effect of model error $\delta$ on the estimation error $\tilde{x}_2$ can be made small enough from equation (22). Therefore by using the high-gain observer for a model which has injection pressure as a state variable, the above requirement (B) "High-precision detection" for a pressure detecting means can be satisfied.

When the effect of model error $\delta$ on the estimation error $\tilde{x}_2$ is neglected, equation (22) is rewritten as equation (23).
{Math. 20}

$$\varepsilon\dot{\tilde{x}}_2 = -K\tilde{x}_2 \tag{23}$$

The estimation error $\tilde{x}_2$ is given by equation (24) from equation (23).

{Math. 21}

$$\tilde{x}_2(t) = \exp\!\left(-\frac{K}{\varepsilon}t\right)\tilde{x}_{20} \tag{24}$$

where $\tilde{x}_{20}$: Initial value of $\tilde{x}_2$. As $\epsilon$ is much smaller than 1, equation (24) reveals that the time response $\tilde{x}_2(t)$ of estimation error tends to zero rapidly. In other words, by using high-gain observer equation (16), the above requirement (A) "Detection with small time-lag" for a pressure detecting means can be satisfied. As in equation (16) the minimum number of state variables to be estimated are included and the measurable state variables are excluded, equation (16) is called by a reduced-order high-gain observer because the order of observer equation (16) is lower than that of observer equation (6).

Then a procedure to modify equation (16) is shown so that the time-derivative term of output y is not appeared. A new variable $\hat{w}$ is given by equation (25).
{Math. 22}

$$\hat{w} = \hat{x}_2 - Hy \tag{25}$$

By using equation (25), equation (16) is rewritten as equation (26).
{Math. 23}

$$\dot{\hat{w}} = -H(\hat{w} + Hy) + \Phi_0(\hat{w}, y, u) \tag{26}$$

Variable $\hat{w}$ is calculated by equation (26) and estimate $\hat{x}_2$ is obtained by equation (27).

{Math. 24}

$$\hat{x}_2 = \hat{w} + H_y \quad (27)$$

Procedures of applying a high-gain observer to a model of electric-motor driven injection molding machines which has injection pressure as a state variable are described in detail in Example 1 and Example 2 to be hereinafter described.

Advantageous Effects of Invention

By applying a high-gain observer to a model of electric-motor driven injection molding machines which has injection pressure as a state variable, a high-precision pressure detection with small time-lag becomes possible without using a pressure detector. By using the high-gain observer the two requirements (1) and (2) described in Background Art for controlling pressure of electric-motor driven injection molding machines can be satisfied and also the four disadvantages described in Background Art can be avoided.

BRIEF DESCRIPTION OF DRAWINGS

FIG. 1 is an explanation drawing of working example 1 which shows a block diagram of a controller for an electric-motor driven injection molding machine according to an embodiment of the present invention.

FIG. 2 is an explanation drawing of working example 2 which shows a block diagram of a controller for an electric-motor driven injection molding machine according to an embodiment of the present invention.

FIG. 3 is a view which shows an existing injection and pressure application mechanism of an electric-motor driven injection molding machine.

FIG. 4 is an explanation drawing which shows a time schedule of manufacturing a molding product.

FIG. 5 is an explanation drawing which shows a block diagram of an existing controller for an electric-motor driven injection molding machine.

FIG. 6 is a view which shows an injection and pressure application mechanism of an electric-motor driven injection molding machine according to an embodiment of the present invention.

FIG. 7 is an explanation drawing of working example 1 which shows computer simulation results of injection pressure estimation by the high-gain observer according to an embodiment of the present invention.

FIG. 8 is an explanation drawing of working example 1 which shows computer simulation results of injection velocity estimation by the high-gain observer according to an embodiment of the present invention.

FIG. 9 is an explanation drawing of working example 2 which shows computer simulation results of injection pressure estimation by the high-gain observer according to an embodiment of the present invention.

DESCRIPTION OF EMBODIMENT

Hereinafter, the embodiment of the present invention on the controller of electric-motor driven injection molding machines is described based on the drawings.

EXAMPLE 1

FIG. 6 is a view which shows an injection and pressure application mechanism without using a pressure detector. As the mechanism in FIG. 6 consists of the parts with the same reference signs as in FIG. 3 except a pressure detector 10, explanations of FIG. 6 are replaced by those of FIG. 3 described in Background Art.

FIG. 1 is an example of a controller of an electric-motor driven injection molding machine using a high-gain observer as an injection pressure detecting means according to an embodiment of the present invention and shows a block diagram of the controller. The controller consists of an injection controller 20 which contains a high-gain observer 31 and a motor controller 40.

The injection controller 20 is explained as follows. The injection controller 20 executes a control algorithm at a constant time interval $\Delta t$ and feeds a discrete-time control demand to the motor controller 40. The injection controller 20 consists of an injection velocity setting device 21, a transducer 22, a pulse generator 23, an injection pressure setting device 26, a subtractor 27, a pressure controller 28, a D/A converter 29, an A/D converter 30 and a high-gain observer 31.

The injection velocity setting device 21 feeds a time sequence of injection velocity command $V^*_i$ to the transducer 22. The transducer 22 calculates screw displacement command $\Delta x^*_v$ for the screw 9 which has to move during the time interval $\Delta t$ by the following equation (28).

{Math. 25}

$$\Delta x^*_v = V^*_i \Delta t \quad (28)$$

The command $\Delta x^*_v$ is fed to the pulse generator 23 which feeds a pulse train 24 corresponding to the command $\Delta x^*_v$. The pulse train 24 is fed to a pulse counter 41 in the motor controller 40.

The injection pressure setting device 26 feeds a time sequence of injection pressure command $P^*_i$ to the subtractor 27. Motor current demand $i^*$ in the motor controller 40 is fed to the high-gain observer 31 through the A/D converter 30 in the injection controller 20. The screw position signal x which is fed by a pulse counter 44 in the motor controller 40 is fed to the high-gain observer 31. The high-gain observer 31 executes discrete-time arithmetic expressions which are obtained from a mathematical model of an injection mechanism and outputs an estimate of injection pressure $\hat{P}_i$ and an estimate of injection velocity $\hat{v}$ not shown in FIG. 1 by using the input signals x and $i^*$.

The estimate $\hat{P}_i$ is fed to the subtractor 27. The subtractor 27 calculates a pressure control deviation $\Delta P_i$ from injection pressure command $P^*_i$ by equation (29).

{Math. 26}

$$\Delta P_i = P^*_i - \hat{P}_i \quad (29)$$

The subtractor 27 feeds $\Delta P_i$ to the pressure controller 28.

The pressure controller 28 calculates a motor current demand $i^*_p$ from $\Delta P_i$ by using PID control algorithm and feeds the demand $i^*_p$ to the motor controller 40 through the D/A converter 29.

The motor controller 40 is explained as follows. The motor controller 40 consists of pulse counters 41 and 44, an A/D converter 42, a comparator 43, subtractors 45 and 48, a position controller 46, a differentiator 47, a velocity controller 49 and a PWM device 50. The motor controller 40 is connected to the servomotor 3 equipped with the rotary encoder 12. The motor current demand $i^*_p$ is fed to the comparator 43 through the A/D converter 42.

The pulse counter 41 accumulates the pulse train 24 from the injection controller 20 and obtains screw position demand x* and outputs the demand x* to the subtractor 45. The pulse counter 44 accumulates the pulse train from the rotary encoder 12 and obtains the actual screw position x and feeds the position x to the subtractor 45.

The subtractor 45 calculates a position control deviation (x*−x) and feeds the position deviation to the position controller 46. The position controller 46 calculates velocity demand v* by the following equation (30) and feeds the demand v* to the subtractor 48.

{Math. 27}

$$v^* = K_P(x^* - x) \tag{30}$$

where $K_P$ is a proportional gain constant of the position controller 46. The rotary encoder 12 feeds the pulse train to the differentiator 47 and to the pulse counter 44. The differentiator 47 detects an actual screw velocity v and feeds the velocity v to the subtractor 48.

The subtractor 48 calculates a velocity control deviation (v*−v) and feeds the deviation to the velocity controller 49. The velocity controller 49 calculates a motor current demand $i^*_v$ by the following equation (31) and feeds the demand $i^*_v$ to the comparator 43.

{Math. 28}

$$i^*_v = K_{Pv}(v^* - v) + \frac{K_{Pv}}{T_{Iv}} \int (v^* - v) dt \tag{31}$$

where $K_{Pv}$ and $T_{Iv}$ are a proportional gain constant and an integral time constant of the velocity controller 49, respectively.

The comparator 43 to which motor current demands $i^*_v$ and $i^*_p$ are given from the velocity controller 49 and the pressure controller 28, respectively, selects the lower current demand i* of $i^*_v$ and $i^*_p$ and feeds the demand i* to the PWM device 50. The PWM device 50 applies three-phase voltage to the servomotor 3 so that the servomotor 3 is driven by the motor current demand i*.

That the above two requirements (1) and (2) for the controller of electric-motor driven injection molding machines are realized by the comparator 43, is already described in detail in Background Art.

The high-gain observer 31 outputs estimate $\hat{P}_i$ of injection pressure and estimate $\hat{v}$ of injection velocity by using screw position signal x and motor current demand signal i*. The mathematical model of an injection mechanism shown in FIG. 6 is derived as follows, which is necessary to design the high-gain observer 31. A motion equation of the motor 3 axis is given by equation (32).

{Math. 29}

$$(J_M + J_{G1})\frac{d\omega_m}{dt} = T_M - r_1 F \tag{32}$$

where $J_M$: Moment of inertia of motor itself, $J_{G1}$: Moment of inertia of motor-side gear, $w_m$: Angular velocity of motor, $T_M$: Motor torque, $r_1$: Radius of motor-side gear, F: Transmission force of reduction gear, t: Time variable. A motion equation of the ball screw 5 axis is given by equation (33).

{Math. 30}

$$(J_S + J_{G2})\frac{d\omega_s}{dt} = r_2 F - T_a \tag{33}$$

where $J_S$: Moment of inertia of ball screw axis, $J_{G2}$: Moment of inertia of load-side gear, $w_s$: Angular velocity of ball screw axis, $r_2$: Radius of load-side gear, $T_a$: Ball screw drive torque. A motion equation of the moving part 8 is given by equations (34) and (35).

{Math. 31}

$$\frac{W}{g}\frac{dv}{dt} = F_a - F_L - \mu W \frac{v}{|v|} \tag{34}$$

$$\frac{dx}{dt} = v \tag{35}$$

where W: Weight of the moving part 8, g: Gravity acceleration, v: Velocity of the moving part (the screw), x: Screw position (initial position x=0), $F_a$: Drive force of the ball screw, $F_L$: Applied force by polymer to the screw, μ: Friction coefficient at the slider. A relation between ball screw drive force $F_a$ and ball screw drive torque $T_a$ is given by equation (36).

{Math. 32}

$$T_a = \frac{l}{2\pi}\frac{1}{\eta}F_a \tag{36}$$

where l: Ball screw lead, η: Ball screw efficiency. Equations among v, $w_a$ and $w_m$ are given by equation (37).

{Math. 33}

$$v = \frac{l}{2\pi}\omega_s = \frac{l}{2\pi}\frac{r_1}{r_2}\omega_m \tag{37}$$

Applied force to the screw $F_L$ is given by equation (38).

{Math. 34}

$$F_L = A_s P_i + C_{mt}\frac{v}{|v|}|v|^\gamma \tag{38}$$

where $A_s$: Screw section area, $P_i$: Injection pressure which means polymer pressure at the end of a barrel, $C_{mt}$: Friction coefficient between the screw and the barrel surface, γ: Velocity power coefficient. A dynamic equation of injection pressure $P_i$ is given by equations (39) and (40).

{Math. 35}

$$\frac{V_i}{\beta}\frac{dP_i}{dt} = A_s v - Q_{in} \tag{39}$$

$$V_i = V_{i0} - A_s x \tag{40}$$

where $V_i$: Polymer volume at the end of a barrel, $V_{i0}$: Initial volume of $V_i$, $Q_{in}$: Injected rate of polymer, $\beta$: Bulk modulus of polymer. The characteristics of the servomotor 3 is given by equation (41).

{Math. 36}

$$T_M = K_T i_m \tag{41}$$

where $K_T$: Motor torque coefficient, $i_m$: Motor current. By using equations (32), (33) and (37) and deleting $w_s$ and F, equation (42) is derived.

{Math. 37}

$$\left\{J_M + J_{G1} + (J_S + J_{G2})\left(\frac{r_1}{r_2}\right)^2\right\}\frac{d\omega_m}{dt} = T_M - \frac{r_1}{r_2}T_a \tag{42}$$

By using equations (34), (36), (37) and (42) and deleting $T_a$ and $F_a$, equation (43) is derived.

{Math. 38}

$$J_{eq}\frac{d\omega_m}{dt} = T_M - \frac{l}{2\pi}\frac{1}{\eta}\frac{r_1}{r_2}\left(F_L + \mu W\frac{v}{|v|}\right) \tag{43}$$

$$J_{eq} = J_M + J_{G1} + (J_S + J_{G1})\left(\frac{r_1}{r_2}\right)^2 + \frac{W}{g}\left(\frac{r_1}{r_2}\right)^2\left(\frac{l}{2\pi}\right)^2\frac{1}{\eta} \tag{44}$$

where $J_{eq}$: Reduced moment of inertia at motor axis. Equation (43) is the motion equation of total injection molding mechanism converted to the motor axis. From equations (35) and (37), equation (45) is derived.

{Math. 39}

$$\frac{dx}{dt} = \frac{r_1}{r_2}\frac{l}{2\pi}\omega_m \tag{45}$$

From equations (38), (41) and (43), the motion equation of the total mechanism is given by equation (46).

{Math. 40}

$$J_{eq}\frac{d\omega_m}{dt} = K_T i_m - \frac{l}{2\pi}\frac{1}{\eta}\frac{r_1}{r_2}\left\{A_s P_i + C_{mt}\frac{v}{|v|}|v|^\gamma + \mu W\frac{v}{|v|}\right\} \tag{46}$$

Equation (40) is rewritten as equation (47).
{Math. 41}

$$V_i = A_s(x_{max} - x) \tag{47}$$

where $x_{max}$: Maximum screw stroke. By using equations (37) and (47), equation (39) is rewritten as equation (48).

{Math. 42}

$$\frac{A_s(x_{max} - x)}{\beta}\frac{dP_i}{dt} = A_s\frac{l}{2\pi}\frac{r_1}{r_2}\omega_m - Q_{in} \tag{48}$$

The variables in the above equations are made dimensionless. By using dimensionless variables, equation (45) is rewritten as equation (49).

{Math. 43}

$$\frac{d}{dt}\left[\frac{x}{x_{max}}\right] = \frac{l}{2\pi}\frac{r_1}{r_2}\frac{\omega_{max}}{x_{max}}\left[\frac{\omega_m}{\omega_{max}}\right] = \frac{v_{max}}{x_{max}}\left[\frac{\omega_m}{\omega_{max}}\right] \tag{49}$$

where $w_{max}$: Motor rating speed, $v_{max}$: Maximum injection velocity.

By using dimensionless variables, equation (46) is rewritten as equation (50).

{Math. 44}

$$J_{eq}\omega_{max}\frac{d}{dt}\left[\frac{\omega_m}{\omega_{max}}\right] = K_T i_{max}\left[\frac{i_m}{i_{max}}\right] - \frac{l}{2\pi}\frac{1}{\eta}\frac{r_1}{r_2}A_s P_{max}\left[\frac{P_i}{P_{max}}\right] - \frac{l}{2\pi}\frac{1}{\eta}\frac{r_1}{r_2}\frac{\left[\frac{\omega_m}{\omega_{max}}\right]}{\left|\left[\frac{\omega_m}{\omega_{max}}\right]\right|}\left\{C_{mt}v_{max}^\gamma\left|\left[\frac{\omega_m}{\omega_{max}}\right]\right|^\gamma + \mu W\right\} \tag{50}$$

where $i_{max}$: Motor current rating, $P_{max}$: Maximum injection pressure. In deriving equation (50), equation (51) is used.

{Math. 45}

$$\left[\frac{v}{v_{max}}\right] = \left[\frac{\omega_m}{\omega_{max}}\right] \tag{51}$$

Equation (50) is rewritten as equation (52).

{Math. 46}

$$\frac{d}{dt}\left[\frac{\omega_m}{\omega_{max}}\right] = \frac{T_{Mmax}}{J_{eq}\omega_{max}}\left[\frac{i_m}{i_{max}}\right] - \frac{l}{2\pi}\frac{1}{\eta}\frac{r_1}{r_2}\frac{A_s P_{max}}{J_{eq}\omega_{max}}\left[\frac{P_i}{P_{max}}\right] - \frac{l}{2\pi}\frac{1}{\eta}\frac{r_1}{r_2}\frac{1}{J_{eq}\omega_{max}}\frac{\left[\frac{\omega_m}{\omega_{max}}\right]}{\left|\left[\frac{\omega_m}{\omega_{max}}\right]\right|}\left\{C_{mt}v_{max}^\gamma\left|\left[\frac{\omega_m}{\omega_{max}}\right]\right|^\gamma + \mu W\right\} \tag{52}$$

where $T_{Mmax} = K_T i_{max}$: Motor rating torque.
By using dimensionless variables, equation (48) is rewritten as equation (53).

{Math. 47}

$$\frac{1}{\beta}A_s x_{max} P_{max}\left\{1 - \left[\frac{x}{x_{max}}\right]\right\}\frac{d}{dt}\left[\frac{P_i}{P_{max}}\right] = A_s v_{max}\left\{\left[\frac{\omega_m}{\omega_{max}}\right] - \left[\frac{Q_{in}}{Q_{max}}\right]\right\} \tag{53}$$

where $Q_{max} = A_s v_{max}$: Maximum injection rate. Equation (53) is rewritten as equation (54).

{Math. 48}

$$\frac{d}{dt}\left[\frac{P_i}{P_{max}}\right] = \frac{\beta}{1 - \left[\frac{x}{x_{max}}\right]}\frac{v_{max}}{x_{max}P_{max}}\left\{\left[\frac{\omega_m}{\omega_{max}}\right] - \left[\frac{Q_{in}}{Q_{max}}\right]\right\} \tag{54}$$

In general dimensionless injection rate $[Q_{in}/Q_{max}]$ is a function of dimensionless injection pressure $[P_i/P_{max}]$ given by equation (55). The function (55) is decided by a nozzle shape of a barrel, an entrance shape of the mold, a cavity shape and a polymer characteristics.

[Math. 49]

$$\left[\frac{Q_{in}}{Q_{max}}\right] = f\left(\left[\frac{P_i}{P_{max}}\right]\right) \tag{55}$$

The mathematical model necessary for designing the high-gain observer 31 is given by equations (56), (57) and (58) by using equations (49), (52), (54) and (55).

{Math. 50}

$$\frac{d}{dt}\left[\frac{x}{x_{max}}\right] = \frac{v_{max}}{x_{max}}\left[\frac{\omega_m}{\omega_{max}}\right] \tag{56}$$

$$\frac{d}{dt}\left[\frac{\omega_m}{\omega_{max}}\right] = \frac{T_{Mmax}}{J_{eq}\omega_{max}}\left[\frac{i_m}{i_{max}}\right] - \frac{l}{2\pi}\frac{1}{\eta}\frac{r_1}{r_2}\frac{A_s P_{max}}{J_{eq}\omega_{max}}\left[\frac{P_i}{P_{max}}\right] - \frac{l}{2\pi}\frac{1}{\eta}\frac{r_1}{r_2}\frac{1}{J_{eq}\omega_{max}}\left[\frac{\omega_m}{\omega_{max}}\right]\left\{C_{mt}v_{max}^\alpha\left|\left[\frac{\omega_m}{\omega_{max}}\right]\right|^\alpha + \mu W\right\} \tag{57}$$

$$\frac{d}{dt}\left[\frac{P_i}{P_{max}}\right] = \frac{\beta}{1 - \left[\frac{x}{x_{max}}\right]}\frac{v_{max}}{x_{max}P_{max}}\left\{\left[\frac{\omega_m}{\omega_{max}}\right] - f\left(\left[\frac{P_i}{P_{max}}\right]\right)\right\} \tag{58}$$

When the cavity is filled up with polymer melt, equation (59) is satisfied.

{Math. 51}

$$f\left(\left[\frac{P_i}{P_{max}}\right]\right) = 0 \tag{59}$$

The following state variables $x_1$, $x_2$ and $x_3$ defined by equation (60) are introduced.

{Math. 52}

$$x_1 = \frac{x}{x_{max}} \quad x_2 = \frac{\omega_m}{\omega_{max}} \quad x_3 = \frac{P_i}{P_{max}} \tag{60}$$

Input variable u defined by equation (61) is introduced. u is measurable. In the design of high-gain observer 31, the actual motor current $i_m$ is considered to be equal to motor current demand i*.

{Math. 53}

$$u = \frac{i_m}{i_{max}} \tag{61}$$

The state variable $x_1$ is supposed to be measurable and output variable y is defined by equation (62).
{Math. 54}

$$y = x_1 \tag{62}$$

The state equations representing equations (56), (57), (58) and (62) are given by equations (63) and (64).

{Math. 55}

$$\begin{aligned}\dot{x}_1 &= ax_2 \\ \dot{x}_2 &= bx_3 + \chi(x_2) + cu \\ \dot{x}_3 &= \frac{d}{1-x_1}\{x_2 - f(x_3)\} = \psi(x)\end{aligned} \tag{63}$$

$$y = x_1 \tag{64}$$

$$x = \begin{bmatrix} x_1 \\ x_2 \\ x_3 \end{bmatrix} \quad \chi(x_2) = e\frac{x_2}{|x_2|}(h|x_2|^\gamma + p) \tag{65}$$

$$\begin{aligned} a &= \frac{v_{max}}{x_{max}} & b &= -\frac{l}{2\pi}\frac{1}{\eta}\frac{r_1}{r_2}\frac{A_s P_{max}}{J_{eq}\omega_{max}} & c &= \frac{T_{Mmax}}{J_{eq}\omega_{max}} \\ d &= \frac{\beta v_{max}}{x_{max}P_{max}} & e &= -\frac{l}{2\pi}\frac{1}{\eta}\frac{r_1}{r_2}\frac{1}{J_{eq}\omega_{max}} & h &= C_{mt}v_{max}^\gamma & p &= \mu W \end{aligned} \tag{66}$$

where $\chi(x_2)$ and $\psi(x)$ are nonlinear functions. Equations (63) and (64) are rewritten as equations (67) and (68) by using a vector x in the above equation (65).

{Math. 56}

$$\dot{x} = Ax + \begin{bmatrix} 0 \\ \chi(x_2) + cu \\ \psi(x) \end{bmatrix} \quad A = \begin{bmatrix} 0 & a & 0 \\ 0 & 0 & b \\ 0 & 0 & 0 \end{bmatrix} \tag{67}$$

$$y = [1 \ 0 \ 0]x \tag{68}$$

New state variables $X_1$ and $X_2$ are introduced by equation (69).

{Math. 57}

$$X_1 = x_1 \quad X_2 = \begin{bmatrix} x_2 \\ x_3 \end{bmatrix} \quad X = \begin{bmatrix} X_1 \\ X_2 \end{bmatrix} \tag{69}$$

Equations (67) and (68) are rewritten as equations (70) and (71) by using equation (69).

{Math. 58}

$$\begin{bmatrix} \dot{X}_1 \\ \dot{X}_2 \end{bmatrix} = \begin{bmatrix} A_{11} & A_{12} \\ A_{21} & A_{22} \end{bmatrix}\begin{bmatrix} X_1 \\ X_2 \end{bmatrix} + \begin{bmatrix} B_1 \\ B_2 \end{bmatrix}\phi(X, u) \tag{70}$$

$$y = X_1 \tag{71}$$

$$\begin{aligned} A_{11} &= 0 & A_{12} &= [a \ 0] & A_{21} &= \begin{bmatrix} 0 \\ 0 \end{bmatrix} & A_{22} &= \begin{bmatrix} 0 & b \\ 0 & 0 \end{bmatrix} \\ B_1 &= [0 \ 0] & B_2 &= \begin{bmatrix} 1 & 0 \\ 0 & 1 \end{bmatrix} & \phi(X, u) &= \begin{bmatrix} \chi(X_2) + cu \\ \psi(X) \end{bmatrix} \end{aligned} \tag{72}$$

Equation (70) is rewritten as equation (73).

{Math. 59}

$$\begin{aligned} \dot{X}_1 &= A_{12}X_2 \\ \dot{X}_2 &= A_{22}X_2 + \phi(X, u) \end{aligned} \tag{73}$$

As state variable $X_1 = x_1$ is measurable, it is not necessary to estimate state variable $X_1$. Therefore the high-gain observer 31 outputs the estimate of state variable $\hat{X}_2$ by using the screw position signal $X_1 = x_1$ and the motor current demand u. The estimate $\hat{X}_2$ is given by equation (74) (non-patent literature B. D. O. Anderson and J. B. Moore, Optimal Control, Linear Quadratic Methods, 7.2 Deterministic Estimator Design, Prentice-Hall).

{Math. 60}

$$\dot{\hat{X}}_2 = (A_{22} - K A_{12}) \hat{X}_2 + K\dot{y} + \Phi_0(\hat{X}_2, y, u) \tag{74}$$

where K: Gain constant matrix of the high-gain observer 31, $\Phi_0(\hat{X}_2, y, u)$: Nominal function of $\Phi(X, u)$. Equation (74) is rewritten by equation (75).

{Math. 61}

$$\dot{\hat{X}}_2 - K\dot{y} = (A_{22} - K A_{12}) \hat{X}_2 + \Phi_0(\hat{X}_2, y, u) \tag{75}$$

A new variable $\hat{w}$ is introduced by equation (76).
{Math. 62}

$$\hat{w} = \hat{X}_2 - Ky \tag{76}$$

The estimate $\hat{X}_2$ is given by equations (77) and (78) by using equations (75) and (76).
{Math. 63}

$$\dot{\hat{w}} = (A_{22} - K A_{12})(\hat{w} + Ky) + \Phi_0(\hat{w}, y, u) \tag{77}$$

$$\hat{X}_2 = \hat{w} + Ky \tag{78}$$

A positive parameter $\epsilon$ much smaller than 1 is introduced and the gain matrix K is given by equation (79).

{Math. 64}

$$K = \begin{bmatrix} K_1/\varepsilon \\ K_2/\varepsilon^2 \end{bmatrix} \tag{79}$$

Equation (77) is rewritten as equation (80) from equations (72) and (79).

{Math. 65}

$$\begin{bmatrix} \dot{\hat{w}}_1 \\ \dot{\hat{w}}_2 \end{bmatrix} = \begin{bmatrix} -aK_1/\varepsilon & b \\ -aK_2/\varepsilon^2 & 0 \end{bmatrix} \begin{bmatrix} \hat{w}_1 \\ \hat{w}_2 \end{bmatrix} + \begin{bmatrix} (-aK_1^2 + bK_2)/\varepsilon^2 \\ -aK_1 K_2/\varepsilon^3 \end{bmatrix} y + \begin{bmatrix} \chi_0(\hat{w}_1, y) + cu \\ \psi_0(\hat{w}, y) \end{bmatrix} \tag{80}$$

where $\chi_0(\hat{w}_1, y)$ and $\psi_0(\hat{w}, y)$ are nominal functions of $\chi(X_2)$ and $\psi(X)$, respectively.
New variables $\hat{\eta}_1, \hat{\eta}_2$ are given by equation (81).

{Math. 66}

$$\hat{\eta} = \begin{bmatrix} \hat{\eta}_1 \\ \hat{\eta}_2 \end{bmatrix} = \begin{bmatrix} \varepsilon & 0 \\ 0 & \varepsilon^2 \end{bmatrix} \begin{bmatrix} \hat{w}_1 \\ \hat{w}_2 \end{bmatrix} = D \begin{bmatrix} \hat{w}_1 \\ \hat{w}_2 \end{bmatrix} \quad D = \begin{bmatrix} \varepsilon & 0 \\ 0 & \varepsilon^2 \end{bmatrix} \tag{81}$$

Equation (80) is rewritten as equation (82) by using equation (81).

{Math. 67}

$$\begin{bmatrix} \dot{\hat{\eta}}_1 \\ \dot{\hat{\eta}}_2 \end{bmatrix} = \frac{1}{\varepsilon}(A_{22} - K_0 A_{12}) \left\{ \begin{bmatrix} \hat{\eta}_1 \\ \hat{\eta}_2 \end{bmatrix} + K_0 y \right\} + \begin{bmatrix} \varepsilon \chi_0(\hat{n}_1, y) + \varepsilon cu \\ \varepsilon^2 \psi_0(\hat{\eta}, y) \end{bmatrix} \tag{82}$$

$$K_0 = \begin{bmatrix} K_1 \\ K_2 \end{bmatrix}$$

Equation (83) is given from equation (81).

{Math. 68}

$$\begin{bmatrix} \hat{w}_1 \\ \hat{w}_2 \end{bmatrix} = D^{-1} \begin{bmatrix} \hat{\eta}_1 \\ \hat{\eta}_2 \end{bmatrix} \tag{83}$$

Equation (79) is rewritten as equation (84).
{Math. 69}

$$K = D^{-1} K_0 \tag{84}$$

By using equations (83) and (84), equation (78) is rewritten as equation (85).

{Math. 70}

$$\hat{X}_2 = \begin{bmatrix} \hat{x}_2 \\ \hat{x}_3 \end{bmatrix} = D^{-1} \begin{bmatrix} \hat{\eta}_1 \\ \hat{\eta}_2 \end{bmatrix} + D^{-1} K_0 y = \begin{bmatrix} (\hat{\eta}_1 + K_1 y)/\varepsilon \\ (\hat{\eta}_2 + K_2 y)/\varepsilon^2 \end{bmatrix} \tag{85}$$

Thus the estimates of state variables $\hat{x}_2, \hat{x}_3$ are obtained by the high-gain observer 31. From equations (82) and (85), the calculation procedures are given by equations (86) and (87).

(1) Calculation procedure 1

{Math. 71}

$$\begin{bmatrix} \dot{\hat{\eta}}_1 \\ \dot{\hat{\eta}}_2 \end{bmatrix} = \frac{1}{\varepsilon}(A_{22} - K_0 A_{12}) \left\{ \begin{bmatrix} \hat{\eta}_1 \\ \hat{\eta}_2 \end{bmatrix} + K_0 y \right\} + \begin{bmatrix} \varepsilon \chi_0(\hat{n}_1, y) + \varepsilon cu \\ \varepsilon^2 \psi_0(\hat{\eta}_1, \hat{\eta}_2, y) \end{bmatrix} \tag{86}$$

(2) Calculation procedure 2

{Math. 72}

$$\begin{bmatrix} \hat{x}_2 \\ \hat{x}_3 \end{bmatrix} = D^{-1} \begin{bmatrix} \hat{\eta}_1 \\ \hat{\eta}_2 \end{bmatrix} + D^{-1} K_0 y = \begin{bmatrix} (\hat{\eta}_1 + K_1 y)/\varepsilon \\ (\hat{\eta}_2 + K_2 y)/\varepsilon^2 \end{bmatrix} \tag{87}$$

By the calculation procedure 1, the estimates $\hat{\eta}_1$ and $\hat{\eta}_2$ are obtained and by the calculation procedure 2 the estimates $\hat{x}_2$ and $\hat{x}_3$ are obtained.

Then it is shown that the high-gain observer 31 as the pressure detecting means satisfies the following two requirements (A) and (B) described in Solution to Problem.

(A) The detection means has very small time-lag.
(B) The detection means is high-precision.

If the nominal functions $\chi_0(\hat{\eta}_1, y)$ and $\psi_0(\hat{\eta}, y)$ in equation (86) are replaced with the true but actually unobtainable functions $\chi(\eta_1, y)$ and $\psi(\eta, y)$, the true values $\eta_1, \eta_2$ of the estimates $\hat{\eta}_1, \hat{\eta}_2$ may be obtained by equation (88).

{Math. 73}

$$\begin{bmatrix} \dot{\eta}_1 \\ \dot{\eta}_2 \end{bmatrix} = \frac{1}{\varepsilon}(A_{22} - K_0 A_{12})\left\{\begin{bmatrix} \eta_1 \\ \eta_2 \end{bmatrix} + K_0 y\right\} + \begin{bmatrix} \varepsilon\chi(\eta_1, y) + \varepsilon c u \\ \varepsilon^2 \psi(\eta_1, \eta_2, y) \end{bmatrix} \quad (88)$$

Then the estimate errors $\tilde{\eta}_1 = \eta_1 - \hat{\eta}_1$ and $\tilde{\eta}_2 = \eta_2 - \hat{\eta}_2$ are obtained by equation (89) by using equations (86) and (88).

{Math. 74}

$$\begin{bmatrix} \dot{\tilde{\eta}}_1 \\ \dot{\tilde{\eta}}_2 \end{bmatrix} = \frac{1}{\varepsilon}(A_{22} - K_0 A_{12})\begin{bmatrix} \tilde{\eta}_1 \\ \tilde{\eta}_2 \end{bmatrix} + \begin{bmatrix} \varepsilon\delta_1(\eta_1, \hat{\eta}_1, y) \\ \varepsilon^2 \delta_2(\eta, \hat{\eta}, y) \end{bmatrix} \quad (89)$$

$$\delta_1(\eta_1, \hat{\eta}_1, y) = \chi(\eta_1, y) - \chi_0(\hat{\eta}_1, y)$$

$$\delta_2(\eta, \hat{\eta}, y) = \psi(\eta, y) - \psi_0(\hat{\eta}, y)$$

As $\varepsilon$ is much smaller than 1, the effects of model errors $\delta_1$ and $\delta_2$ on the estimation errors $\tilde{\eta}_1$ and $\tilde{\eta}_2$ can be made small enough by equation (89). In other words, the high-gain observer 31 satisfies the above requirement (B) "High-precision detection" for injection pressure estimate $\hat{x}_3$ and injection velocity (motor speed) estimate $\hat{x}_2$.

When the effects of model errors $\delta_1$ and $\delta_2$ on the estimation errors are neglected in equation (89), equation (89) is rewritten as equation (90).

{Math. 75}

$$\begin{bmatrix} \dot{\tilde{\eta}}_1 \\ \dot{\tilde{\eta}}_2 \end{bmatrix} = \frac{1}{\varepsilon}A_0\begin{bmatrix} \tilde{\eta}_1 \\ \tilde{\eta}_2 \end{bmatrix} \quad A_0 = A_{22} - K_0 A_{12} \quad (90)$$

When matrix $K_0$ is decided so that the real part of conjugate complex eigenvalues $\lambda_1$, $\bar{\lambda}_1$ of matrix $A_0$ becomes negative, that is, $Re(\lambda_1) = Re(\bar{\lambda}_1) < 0$, the estimate errors $\tilde{\eta}_1$, $\tilde{\eta}_2$ are given by equation (91) with initial values $\tilde{\eta}_{10}$, $\tilde{\eta}_{20}$.

{Math. 76}

$$\tilde{\eta}_1(t) = \exp\left(\frac{Re(\lambda_1)}{\varepsilon}t\right)(C_1(t)\tilde{\eta}_{10} + C_2(t)\tilde{\eta}_{20}) \quad (91)$$

$$\tilde{\eta}_2(t) = \exp\left(\frac{Re(\lambda_1)}{\varepsilon}t\right)(C_3(t)\tilde{\eta}_{10} + C_4(t)\tilde{\eta}_{20})$$

where t: Time variable, $C_1(t) \sim C_4(t)$: Sinusoidal components with constant amplitudes and constant frequency decided by elements of matrix $A_0$. As $Re(\lambda_1) < 0$ and $\varepsilon$ is much smaller than 1, equation (91) reveals that the time responses $\tilde{\eta}_1(t)$, $\tilde{\eta}_2(t)$ of the estimate errors tend to zero rapidly. In other words, the high-gain observer 31 satisfies the above requirement (A) "Detection with small time-lag" for injection pressure estimate $\hat{x}_3$ and injection velocity (motor speed) estimate $\hat{x}_2$.

As the injection controller 20 executes a control algorithm at a constant time interval $\Delta t$, the arithmetic expressions (86) and (87) of the high-gain observer 31 are transformed into the discrete-time arithmetic expressions (non-patent literatures A. M. Dabroom and H. K. Khalil, Discrete-time implementation of high-gain observers for numerical differentiation, Int. J. Control, A. M. Dabroom and H. K. Khalil, Output Feedback Sampled-Data Control of Nonlinear Systems Using High-Gain Observers, IEEE Trans. Automat. Contr.).

A new parameter $\alpha$ is introduced and the time interval $\Delta t$ is expressed by equation (92).

{Math. 77}

$$\Delta t = \alpha\varepsilon \quad (92)$$

Discrete-time equivalent of the continuous-time equation (86) can be found by using the standard method of forward rectangular rule which gives the relation between the Laplace-transform operator s representing time-derivative operation and z-transform operator z as follows.

{Math. 78}

$$s = \frac{z-1}{\Delta t} = \frac{z-1}{\alpha\varepsilon} \quad (93)$$

By using equation (93), equation (86) is rewritten as equation (94).

{Math. 79}

$$\frac{z-1}{\alpha\varepsilon}\begin{bmatrix} \hat{\eta}_1 \\ \hat{\eta}_2 \end{bmatrix} = \frac{1}{\varepsilon}A_0\left\{\begin{bmatrix} \hat{\eta}_1 \\ \hat{\eta}_2 \end{bmatrix} + K_0 y\right\} + \begin{bmatrix} \varepsilon\chi_0(\hat{\eta}_1, y) + \varepsilon c u \\ \varepsilon^2 \psi_0(\hat{\eta}_1, \hat{\eta}_2, y) \end{bmatrix} \quad (94)$$

The discrete-time expression of equation (94) is given by equation (95).

{Math. 80}

$$\begin{bmatrix} \hat{\eta}_1(k+1) \\ \hat{\eta}_2(k+1) \end{bmatrix} - \begin{bmatrix} \hat{\eta}_1(k) \\ \hat{\eta}_2(k) \end{bmatrix} = \quad (95)$$

$$\alpha A_0\left\{\begin{bmatrix} \hat{\eta}_1(k) \\ \hat{\eta}_2(k) \end{bmatrix} + K_0 y(k)\right\} + \alpha\begin{bmatrix} \varepsilon^2 \chi_0(k) + \varepsilon^2 c u(k) \\ \varepsilon^3 \psi_0(k) \end{bmatrix}$$

$$\chi_0(k) = e\frac{\hat{x}_2(k)}{|\hat{x}_2(k)|}(h|\hat{x}_2(k)|^{\gamma} + p) \quad (96)$$

$$\psi_0(k) = \frac{d}{1-y(k)}\{\hat{x}_2(k) - f(\hat{x}_3(k))\}$$

where $\hat{\eta}_1(k)$, $\hat{\eta}_2(k)$: Estimates $\hat{\eta}_1(t_k)$, $\hat{\eta}_2(t_k)$ at a discrete-time $t_k$, y(k), u(k): $y(t_k)$, $u(t_k)$ at a discrete-time $t_k$, $\hat{x}_2(k)$, $\hat{x}_3(k)$: Estimates $\hat{x}_2(t_k)$, $\hat{x}_3(t_k)$ at a discrete-time $t_k$, $\chi_0(k)$, $\psi_0(k)$: $\chi_0(t_k)$, $\psi_0(t_k)$ at a discrete-time $t_k$. $\chi_0(k)$ is given by equation (65) and $\psi_0(k)$ is given by the third equation of equation (63). Equation (95) is rewritten as equation (97).

{Math. 81}

$$\begin{bmatrix} \hat{\eta}_1(k+1) \\ \hat{\eta}_2(k+1) \end{bmatrix} = \quad (97)$$

$$(I_2 + \alpha A_0)\begin{bmatrix} \hat{\eta}_1(k) \\ \hat{\eta}_2(k) \end{bmatrix} + \alpha A_0 K_0 y(k) + \alpha\begin{bmatrix} \varepsilon^2 \chi_0(k) + \varepsilon^2 c u(k) \\ \varepsilon^3 \psi_0(k) \end{bmatrix}$$

where $I_2$: 2×2 unit matrix.

The discrete-time equivalent of equation (87) is given by equation (98).

[Math. 82]

$$\begin{bmatrix} \hat{x}_2(k) \\ \hat{x}_3(k) \end{bmatrix} = D^{-1} \begin{bmatrix} \hat{\eta}_1(k) \\ \hat{\eta}_2(k) \end{bmatrix} + D^{-1} K_0 y(k) \quad (98)$$

The high-gain observer 31 obtains injection pressure estimate $\hat{x}_3(k)$ and injection velocity (motor speed) estimate $\hat{x}_2(k)$ at a discrete-time $t_k$ by executing the arithmetic expressions of equations (97) and (98) at a time interval $\Delta t$. The high-gain observer 31 by equations (97) and (98) does not estimate the measurable state variable $x_1(k)$ (screw position) and estimates only necessary state variables $x_3(k)$ and $x_2(k)$ and so is called by a reduced-order high-gain observer.

Injection velocity estimate $\hat{x}_2(k)$ obtained by the high-gain observer 31 can be used to monitor the injection velocity overspeed in the injection controller 20 and this is not shown in FIG. 1. In the motor controller 40, injection velocity estimate $\hat{x}_2(k)$ can be fed to the subtractor 48 as the velocity signal v without using the differentiator 47 in FIG. 1.

FIG. 7 shows the results of computer simulation when the high-gain observer 31 is used for the pressure control of an electric-motor driven injection molding machine. The constants of the mathematical model are as follows.

Maximum screw stroke $x_{max}$=37.2 cm
Maximum injection velocity $v_{max}$=13.2 cm/sec
Maximum injection pressure $P_{max}$=17652 N/cm²
Motor rating speed $w_{max}$=209.4 rad/sec (2000 rpm)

The constants a, b, c and d in equation (63) are expressed in equation (99). In this calculation it is assumed that resistance component $\chi(x_2)$=0.

{Math. 83}

$$\left. \begin{array}{l} a = 0.3556 \text{ sec}^{-1} \\ b = -6.474 \text{ sec}^{-1} \\ c = 3.716 \text{ sec}^{-1} \\ d = 3.626 \text{ sec}^{-1} \end{array} \right\} \quad (99)$$

In order to realize an arbitrary injection pressure time response according to the setting value $P_{set}(t)$, a hydraulic characteristics of solenoid operated proportional relief valve is used for the characteristics of function $f(\hat{P}_i/P_{max})$, which decides the polymer flow into the cavity according to the value of $\hat{P}_i(t)/P_{set}(t)$. The gain matrix K of equation (79) used by the high-gain observer 31 is given by equation (100). The data $K_1$=0.340, $K_2$=−0.00316, $\epsilon$=0.015 and $\Delta t$=5 msec are used.

{Math. 84}

$$K = \begin{bmatrix} 22.67 \\ -14.04 \end{bmatrix} \quad (100)$$

FIG. 7 shows the control performance of injection pressure $[P_i/P_{max}]$. FIG. 7(a) shows the time response of injection pressure $[P_i(t)/P_{max}]$ when the hitherto known control system in FIG. 5 is used and the pressure detector 10 is used. When the high-gain observer 31 is supposed to be used under the control system shown in FIG. 5 and to calculate the estimate of injection pressure $[\hat{P}_i/P_{max}]$ by using screw position signal y(t) and motor current signal u(t), FIG. 7(b) shows the time response of the estimated injection pressure $[\hat{P}_i(t)/P_{max}]$. FIG. 7(c) shows the time response of the actual injection pressure $[P_i(t)/P_{max}]$ when the control system shown in FIG. 1 is used and the estimated injection pressure $[\hat{P}_i(t)/P_{max}]$ obtained by the high-gain observer 31 is fed to the subtractor 27 as a feedback signal of injection pressure, in other words, the pressure detector 10 is not used. The time response of estimated injection pressure $[\hat{P}_i(t)/P_{max}]$ shown in FIG. 7(b) agrees well with that of actual injection pressure $[P_i(t)/P_{max}]$ shown in FIG. 7(a). The time response of actual injection pressure $[P_i(t)/P_{max}]$ shown in FIG. 7(a) agrees well with that of actual injection pressure shown in FIG. 7(c) when using the high-gain observer 31. The transfer from the injection process to the pressure application process is conducted at the screw position $[x/x_{max}]$=0.55 and the time $t_1$ shown in FIG. 4 is 2.6 seconds. Thus the high-gain observer 31 can estimate the injection pressure exactly with small time-lag. The estimate of injection pressure obtained by the high-gain observer 31 can be used to monitor the injection pressure in the injection process and can be used as a feedback signal of injection pressure in the pressure application process.

FIG. 8(a) shows the time response of the actual injection velocity $[v(t)/v_{max}]$ when the control system shown in FIG. 1 is used and FIG. 8(b) shows the time response of the estimated injection velocity $[\hat{v}(t)/v_{max}]$ obtained by the high-gain observer 31. Thus the high-gain observer 31 can also estimate the injection velocity exactly with small time-lag.

EXAMPLE 2

FIG. 2 is an example of a controller of an electric-motor driven injection molding machine using a high-gain observer as an injection pressure detecting means according to an embodiment of the present invention and shows a block diagram of the controller. The controller consists of the injection controller 20 which contains a high-gain observer 32 and the motor controller (servoamplifier) 40.

The injection controller 20 is explained as follows. The injection controller 20 executes a control algorithm at a constant time interval $\Delta t$ and feeds a discrete-time control demand to the motor controller 40. The injection controller 20 consists of the parts with the same reference signs as in Example 1 shown in FIG. 1 and a high-gain observser 32. Descriptions of functions for the parts with the same reference signs as in Example 1 are replaced with those in Example 1.

The high-gain observer 32 is explained as follows. Motor current demand i* in the motor controller 40 is fed to the high-gain observer 32 through the A/D converter 30 in the injection controller 20. The screw position signal x which is fed by the pulse counter 44 in the motor controller 40 is fed to the high-gain observer 32. The screw velocity signal v which is fed by the differentiator 47 in the motor controller 40 is fed to the high-gain observer 32. The high-gain observer 32 executes discrete-time arithmetic expressions which are obtained from a mathematical model of an injection mechanism and outputs estimates $\hat{x}$, $\hat{v}$ and $\hat{P}_i$ of screw position, injection velocity and injection pressure, respectively, by using the input signals x, v and i*.

The motor controller 40 is explained as follows. The motor controller 40 consists of the parts with the same reference signs as in Example 1 shown in FIG. 1. Descriptions of functions for the parts with the same reference signs as in Example 1 are replaced with those in Example 1.

The state equation of a mathematical model for an injection mechanism shown in FIG. 6 necessary to design the high-gain observer 32 is the same as equation (67) in Example 1 and is given by equation (101).

{Math. 85}

$$\dot{x} = Ax + \begin{bmatrix} 0 \\ \chi(x_2) + cu \\ \psi(x) \end{bmatrix} \quad A = \begin{bmatrix} 0 & a & 0 \\ 0 & 0 & b \\ 0 & 0 & 0 \end{bmatrix} \quad x = \begin{bmatrix} x_1 \\ x_2 \\ x_3 \end{bmatrix} \quad (101)$$

The state variables $x_1$, $x_2$, $x_3$ and input variable u are the same as those given by equations (60) and (61), respectively in Example 1.

The screw position $x_1$ and injection velocity (motor speed) $x_2$ are measurable state variables and the output variable y is given by equation (102).

{Math. 86}

$$y = \begin{bmatrix} y_1 \\ y_2 \end{bmatrix} = \begin{bmatrix} 1 & 0 & 0 \\ 0 & 1 & 0 \end{bmatrix} \begin{bmatrix} x_1 \\ x_2 \\ x_3 \end{bmatrix} = Cx \quad (102)$$

$$C = \begin{bmatrix} 1 & 0 & 0 \\ 0 & 1 & 0 \end{bmatrix}$$

The high-gain observer 32 estimates all state variables $\hat{x}_1$, $\hat{x}_2$ and $\hat{x}_3$ by using measurable output variables $y_1 = x_1$, $y_2 = x_2$ and input variable u (motor current demand). The estimates $\hat{x}_1$, $\hat{x}_2$ and $\hat{x}_3$ are given by equation (103) (non-patent literature B. D. O. Anderson and J. B. Moore, Optimal Control, Linear Quadratic Methods, 7.2 Deterministic Estimator Design, Prentice-Hall).

{Math. 87}

$$\dot{\hat{x}} = A\hat{x} + \begin{bmatrix} 0 \\ \chi_0(y_2) + cu \\ \psi_0(\hat{x}) \end{bmatrix} - K(C\hat{x} - y) \quad (103)$$

$$\hat{x} = \begin{bmatrix} \hat{x}_1 \\ \hat{x}_2 \\ \hat{x}_3 \end{bmatrix}$$

where $\chi_0(y_2)$, $\psi_0(\hat{x})$: Nominal functions of $\chi(y_2)$, $\psi(x)$, respectively, K: Gain matrix of the high-gain observer 32. Introducing a positive parameter $\epsilon$ much smaller than 1, K is given by equation (104).

{Math. 88}

$$K = \begin{bmatrix} K_{11}/\epsilon & K_{12} \\ K_{21}/\epsilon^2 & K_{22}/\epsilon \\ K_{31}/\epsilon^3 & K_{32}/\epsilon^2 \end{bmatrix} \quad (104)$$

New estimated variable $\hat{\eta}$ is introduced by equation (105).

{Math. 89}

$$\hat{\eta} = \begin{bmatrix} \hat{\eta}_1 \\ \hat{\eta}_2 \\ \hat{\eta}_3 \end{bmatrix} = \begin{bmatrix} 1 & 0 & 0 \\ 0 & \epsilon & 0 \\ 0 & 0 & \epsilon^2 \end{bmatrix} \begin{bmatrix} \hat{x}_1 \\ \hat{x}_2 \\ \hat{x}_3 \end{bmatrix} = D\hat{x} \quad (105)$$

$$D = \begin{bmatrix} 1 & 0 & 0 \\ 0 & \epsilon & 0 \\ 0 & 0 & \epsilon^2 \end{bmatrix}$$

By using $\hat{\eta}$, equation (103) is rewritten as equations (106) and (107).

{Math. 90}

$$\dot{\hat{\eta}} = \frac{1}{\epsilon}\left\{ A_0\hat{\eta} + K_0\bar{y} + \begin{bmatrix} 0 \\ \epsilon^2\chi_0(y_2) + \epsilon^2 cu \\ \epsilon^3\psi_0(\hat{\eta}_3, y) \end{bmatrix} \right\} \quad (106)$$

$$A_0 = A - K_0 C \quad (107)$$

$$K_0 = \begin{bmatrix} K_{11} & K_{12} \\ K_{21} & K_{22} \\ K_{31} & K_{32} \end{bmatrix}$$

$$\bar{y} = \begin{bmatrix} y_1 \\ \epsilon y_2 \end{bmatrix}$$

Thus the estimates of all state variables $\hat{x}_1$, $\hat{x}_2$ and $\hat{x}_3$ are obtained by the high-gain observer 32. From equations (105) and (106), the calculation procedures are given by equations (108) and (109).

(1) Calculation procedure 1

{Math. 91}

$$\dot{\hat{\eta}} = \frac{1}{\epsilon}\left\{ A_0\hat{\eta} + K_0\bar{y} + \begin{bmatrix} 0 \\ \epsilon^2\chi_0(y_2) + \epsilon^2 cu \\ \epsilon^3\psi_0(\hat{\eta}_3, y) \end{bmatrix} \right\} \quad (108)$$

(2) Calculation procedure 2

{Math. 92}

$$\hat{x} = D^{-1}\hat{\eta} \quad (109)$$

By the calculation procedure 1, the estimate $\hat{\eta}$ is obtained and by the calculation procedure 2, the estimate $\hat{x}$ is obtained.

Then it is shown that the high-gain observer 32 as a pressure detecting means satisfies the following two requirements (A) and (B) described in Solution to Problem.

(A) The detection means has very small time-lag.

(B) The detection means is high-precision.

If the nominal functions $\chi_0(y_2)$, $\psi_0(\hat{\eta}_3, y)$ in equation (106) are replaced with the true but actually unobtainable functions $\chi(y_2)$, $\psi(\eta_3, y)$, the true values $\eta_1$, $\eta_2$ and $\eta_3$ of the estimates $\hat{\eta}_1$, $\hat{\eta}_2$ and $\hat{\eta}_3$ may be obtained by equation (110).

{Math. 93}

$$\dot{\eta} = \frac{1}{\varepsilon}\left\{A_0\eta + K_0\bar{y} + \begin{bmatrix} 0 \\ \varepsilon^2\chi(y_2) + \varepsilon^2 cu \\ \varepsilon^3\psi(\eta_3, y) \end{bmatrix}\right\} \quad (110)$$

The estimate error $\tilde{\eta}=\eta-\hat{\eta}$ is obtained by equation (111) by using equation (106) and (110).

{Math. 94}

$$\dot{\tilde{\eta}} = \frac{1}{\varepsilon}\left\{A_0\tilde{\eta} + \begin{bmatrix} 0 \\ \varepsilon^2\delta_1(y_2) \\ \varepsilon^3\delta_2(\eta_3, \hat{\eta}_3, y) \end{bmatrix}\right\} \quad \tilde{\eta} = \begin{bmatrix} \eta_1 - \hat{\eta}_1 \\ \eta_2 - \hat{\eta}_2 \\ \eta_3 - \hat{\eta}_3 \end{bmatrix}$$

$$\delta_1(y_2) = \chi(y_2) - \chi_0(y_2) \quad \delta_2(\eta_3, \hat{\eta}_3, y) = \psi(\eta_3, y) - \psi_0(\hat{\eta}_3, y) \quad (111)$$

As $\varepsilon$ is much smaller than 1, the effects of model errors $\delta_1$, $\delta_2$ on the estimation error $\tilde{\eta}$ can be made small enough by equation (111). In other words, by using the high-gain observer 32, injection pressure estimate $\hat{x}_3$, injection velocity (motor speed) estimate $\hat{x}_2$ and screw position estimate $\hat{x}_1$ obtained by equations (108) and (109) satisfy the above requirement (B) "High-precision detection".

When the effects of model errors $\delta_1$ and $\delta_2$ on the estimation error are neglected in equation (111), equation (111) is rewritten as equation (112).

{Math. 95}

$$\dot{\tilde{\eta}} = \frac{1}{\varepsilon}A_0\tilde{\eta} \quad A_0 = A - K_0C \quad (112)$$

When matrix $K_0$ is decided so that the real part of conjugate complex eigenvalues $\lambda_1$, $\bar{\lambda}_1$ of matrix $A_0$ becomes negative and real eigenvalue $\lambda_3$ becomes negative, that is, $\text{Re}(\lambda_1)=\text{Re}(\bar{\lambda}_1)<0$ and $\lambda_3<0$, the estimation errors $\tilde{\eta}_1$, $\tilde{\eta}_2$ and $\tilde{\eta}_3$ are given by equation (113) with initial values $\tilde{\eta}_{10}$, $\tilde{\eta}_{20}$ and $\tilde{\eta}_{30}$, respectively.

{Math. 96}

$$\tilde{\eta}_1(t) = \exp\left(\frac{\text{Re}(\lambda_1)}{\varepsilon}t\right)g_1(t, \tilde{\eta}_{10}, \tilde{\eta}_{20}, \tilde{\eta}_{30}) + \exp\left(\frac{\lambda_3}{\varepsilon}t\right)g_2(\tilde{\eta}_{10}, \tilde{\eta}_{20}, \tilde{\eta}_{30})$$

$$\tilde{\eta}_2(t) = \exp\left(\frac{\text{Re}(\lambda_1)}{\varepsilon}t\right)g_3(t, \tilde{\eta}_{10}, \tilde{\eta}_{20}, \tilde{\eta}_{30}) + \exp\left(\frac{\lambda_3}{\varepsilon}t\right)g_4(\tilde{\eta}_{10}, \tilde{\eta}_{20}, \tilde{\eta}_{30})$$

$$\tilde{\eta}_3(t) = \exp\left(\frac{\text{Re}(\lambda_1)}{\varepsilon}t\right)g_5(t, \tilde{\eta}_{10}, \tilde{\eta}_{20}, \tilde{\eta}_{30}) + \exp\left(\frac{\lambda_3}{\varepsilon}t\right)g_6(\tilde{\eta}_{10}, \tilde{\eta}_{20}, \tilde{\eta}_{30}) \quad (113)$$

where t: Time variable, $g_i(t)(i=1\sim6)$: Finite functions decided by elements of matrix $A_0$ and initial values $\tilde{\eta}_{10}$, $\tilde{\eta}_{20}$ and $\tilde{\eta}_{30}$. As $\text{Re}(\lambda_1)<0$, $\lambda_3<0$ and $\varepsilon$ is much smaller than 1, equation (113) reveals that the time responses $\tilde{\eta}_1(t)$, $\tilde{\eta}_2(t)$ and $\tilde{\eta}_3(t)$ of estimation errors tend to zero rapidly. In other words, by using the high-gain observer 32, injection pressure estimate $\hat{x}_3$, injection velocity (motor speed) estimate $\hat{x}_2$ and screw position estimate $\hat{x}_1$ obtained by equations (108) and (109) satisfy the above requirement (A) "Detection with small time-lag".

As the injection controller 20 executes a control algorithm at a constant time interval $\Delta t$, the arithmetic expressions (108) and (109) of the high-gain observer 32 are transformed into the discrete-time equivalents (non-patent literatures A. M. Dabroom and H. K. Khalil, Discrete-time implementation of high-gain observers for numerical differentiation, Int. J. Control, A. M. Dabroom and H. K. Khalil, Output Feedback Sampled-Data Control of Nonlinear Systems Using High-Gain Observers, IEEE Trans. Automat. Contr.).

The time interval $\Delta t$ is expressed by equation (114).

{Math. 97}

$$\Delta t = \alpha\varepsilon \quad (114)$$

Discrete-time equivalent of the continuous-time equation (108) can be found by using the standard method of forward rectangular rule which gives the relation between the Laplace-transform operator s representing time-derivative operation and z-transform operator z as follows.

{Math. 98}

$$s = \frac{z-1}{\Delta t} = \frac{z-1}{\alpha\varepsilon} \quad (115)$$

By using equation (115), equation (108) is rewritten as equation (116).

{Math. 99}

$$\frac{z-1}{\alpha\varepsilon}\hat{\eta} = \frac{1}{\varepsilon}\left\{A_0\hat{\eta} + K_0\bar{y} + \begin{bmatrix} 0 \\ \varepsilon^2\chi_0(y_2) + \varepsilon^2 cu \\ \varepsilon^3\psi_0(\hat{\eta}_3, y) \end{bmatrix}\right\} \quad (116)$$

The discrete-time expression of equation (116) is given by equation (117).

{Math. 100}

$$\hat{\eta}(k+1) - \hat{\eta}(k) = \alpha A_0\hat{\eta}(k) + \alpha K_0\begin{bmatrix} y_1(k) \\ \varepsilon y_2(k) \end{bmatrix} + \alpha\begin{bmatrix} 0 \\ \varepsilon^2\chi_0(k) + \varepsilon^2 cu(k) \\ \varepsilon^3\psi_0(k) \end{bmatrix} \quad (117)$$

$$\chi_0(k) = e\frac{y_2(k)}{|y_2(k)|}(h|y_2(k)|^\gamma + p) \quad \psi_0(k) = \frac{d}{1-y_1(k)}\{y_2(k) - f(\hat{x}_3(k))\} \quad (118)$$

where $\hat{\eta}(k)$: Estimate $\hat{\eta}(t_k)$ at a discrete-time $t_k$, $y_1(k)$, $y_2(k)$, $u(k)$: $y_1(t_k)$, $y_2(t_k)$, $u(t_k)$ at a discrete-time $t_k$, $\hat{x}_3(k)$: Estimate $\hat{x}_3(t_k)$ at a discrete-time $t_k$, $\chi_0(k)$: $\chi^0(t_k)$, $\psi^0(k)$: $\chi_0(t_k)$, $\psi_0(t_k)$ at a discrete-time $t_k$. $\chi_0(k)$ is given by equation (65) and $\psi_0(k)$ is given by the third equation of equation (63). Equation (117) is rewritten as equation (119).

{Math. 101}

$$\hat{\eta}(k+1) = (I_3 + \alpha A_0)\hat{\eta}(k) + \alpha K_0 \begin{bmatrix} y_1(k) \\ \varepsilon y_2(k) \end{bmatrix} + \alpha \begin{bmatrix} 0 \\ \varepsilon^2 \chi_0(k) + \varepsilon^2 cu(k) \\ \varepsilon^3 \psi_0(k) \end{bmatrix} \quad (119)$$

where $I_3$: 3×3 unit matrix.

The discrete-time equivalent of equation (109) is given by equation (120).

{Math. 102}

$$\begin{bmatrix} \hat{x}_1(k) \\ \hat{x}_2(k) \\ \hat{x}_3(k) \end{bmatrix} = D^{-1} \begin{bmatrix} \hat{\eta}_1(k) \\ \hat{\eta}_2(k) \\ \hat{\eta}_3(k) \end{bmatrix} \quad (120)$$

FIG. 9 shows the results of computer simulation when the high-gain observer 32 is used for pressure control of an electric-motor driven injection molding machine. The constants a, b, c and d in equation (101) are the same as those given by equation (99) in Example 1. In this calculation it is assumed that resistance component $\chi(x_2)=0$.

The gain matrix K of equation (104) used by the high-gain observer 32 is given by equation (121). The data $\varepsilon=0.1$ and $\Delta t=5$ msec are used.

{Math. 103}

$$K = \begin{bmatrix} 100.1 & 0.181 \\ 18.1 & 101.9 \\ -5.5 & -31.6 \end{bmatrix} \quad (121)$$

FIG. 9 shows the control performance of injection pressure $[P_i/P_{max}]$. FIG. 9(a) shows the time response of injection pressure $[P_i(t)/P_{max}]$ when the hitherto known control system shown in FIG. 5 is used and the pressure detector 10 is used. When the high-gain observer 32 is supposed to be used under the control system shown in FIG. 5 and to calculate the estimate of injection pressure $[\hat{P}_i/P_{max}]$ by using screw position signal $y_1(t)$, injection velocity (motor speed) signal $y_2(t)$ and motor current signal u(t), FIG. 9(b) shows the time response of estimated injection pressure $[\hat{P}_i(t)/P_{max}]$. FIG. 9(c) shows the time response of the actual injection pressure $[P_i(t)/P_{max}]$ when the control system shown in FIG. 2 is used and the estimated injection pressure $[\hat{P}_i/P_{max}]$ obtained by the high-gain observer 32 is fed to the subtractor 27 as a feedback signal of injection pressure, in other words, the pressure detector 10 is not used. The time response of estimated injection pressure $[\hat{P}_i(t)/P_{max}]$ shown in FIG. 9(b) agrees well with that of the actual injection pressure shown in FIg. 9(a). The time response of actual injection pressure $[P_i(t)/P_{max}]$ in FIG. 9(a) when using the hitherto known control system agrees well with that of actual injection pressure shown in FIG. 9(c) when using the high-gain observer 32. Thus the high-gain observer 32 can estimate the injection pressure exactly with small time-lag. The estimate of injection pressure can be used to monitor the injection pressure in the injection process and can be used as a feedback signal of injection pressure in the pressure application process. The estimates of screw position and injection velocity agree well with the actual values respectively although they are not shown.

The high-gain observer both in Example 1 and Example 2 can be applied for the control of injection molding machines with multi-AC servomotor drive system. The estimate of injection pressure obtained by the high-gain observer is used in the control apparatus and the control method without using a pressure detector.

INDUSTRIAL APPLICABILITY

In the pressure control apparatus and pressure control method of electric-motor driven injection molding machines, the following four disadvantages can be avoided by using the estimated injection pressure obtained by the high-gain observer as a feedback signal of injection pressure in place of a pressure detector.

(1) A highly reliable pressure detector is very expensive under high pressure circumstances.
(2) Mounting a pressure detector in the cavity or the barrel nozzle part necessitates the troublesome works and the working cost becomes considerable.
(3) Mounting a load cell in the injection shafting alignment from a servomotor to a screw complicates the mechanical structure and degrades the mechanical stiffness of the structure.
(4) A load cell which uses strain gauges as a detection device necessitates an electric protection against noise for weak analog signals. Moreover, the works for zero-point adjusting and span adjusting of a signal amplifier are necessary (patent literature Japanese Patent Application 2003-211514).

As the high-gain observer can estimate the injection pressure exactly with small time-lag, the estimate of injection pressure obtained by the high-gain observer can be used to monitor the injection pressure in the injection process and can be used as a feedback signal of injection pressure in the pressure application process. Thus the high-gain observer of the present invention can be applied to the pressure control apparatus and pressure control method of electric-motor driven injection molding machines.

REFERENCE SIGNS LIST

1 Metal mold
2 Barrel
3 Servomotor
4 Reduction gear
5 Ball screw
6 Bearing
7 Nut
8 Moving part
9 Screw
10 Pressure detector
11 Linear slider
12 Rotary encoder
13 Cavity
20 Injection controller
21 Injection velocity setting device
22 Transducer
23 Pulse generator
24 Pulse train
25 Analog/digital (A/D) converter
26 Injection pressure setting device
27 Subtractor
28 Pressure controller
29 Digital/analog (D/A) converter
30 Analog/digital (A/D) converter
31 High-gain observer 32 High-gain observer
40 Motor controller (Servoamplifier)
41 Pulse counter
42 Analog/digital (A/D) converter
43 Comparator
44 Pulse counter
45 Subtractor
46 Position controller
47 Differentiator
48 Subtractor
49 Velocity controller
50 Pulse width modulation (PWM) device

The invention claimed is:

1. An apparatus for controlling pressure in an electric-motor driven injection molding machine having an injection and pressure application mechanism in which rotation of a servomotor is transferred to rotation of a ball screw through a reduction gear and rotation of said ball screw is converted to a linear motion of a nut of said ball screw and said nut drives a moving part and a linear motion of a screw is realized through said moving part and pressure application to a melted polymer stored at the end of a barrel and fill-up of a cavity with polymer melt are realized by a movement of said screw, comprising:

an injection controller operative to provide a motor current demand signal for said servomotor to external, which comprises a high-gain observer operative to execute at a constant time interval discrete-time arithmetic expressions obtained by applying a standard method of forward rectangular rule to continuous-time calculation procedures which are derived from a continuous-time mathematical model of an injection mechanism representing motion equations of said injection and pressure application mechanism and consisting of state equations having three state variables of a screw position variable, an injection velocity variable and an injection pressure variable, one input variable of a motor current demand signal applied to said servomotor or an actual motor current signal and output variables of measured state variables, an injection pressure setting device operative to feed an injection pressure command signal, a subtractor operative to feed a difference signal between said injection pressure command signal from said injection pressure setting device and an estimate of injection pressure which said high-gain observer outputs by using a screw position signal detected by a rotary encoder mounted on a servomotor axis and said motor current demand signal applied to said servomotor or said actual servomotor current signal as inputs and by executing said discrete-time arithmetic expressions built in, and a pressure controller operative to derive said motor current demand signal for said servomotor by using said difference signal from said subtractor operative so that said estimate of injection pressure follows said injection pressure command signal; and a motor controller fed said motor current demand signal from said injection controller.

2. A method for controlling pressure in an electric-motor driven injection molding machine having an injection and pressure application mechanism in which rotation of a servomotor is transferred to rotation of a ball screw through a reduction gear and rotation of said ball screw is converted to a linear motion of a nut of said ball screw and said nut drives a moving part and a linear motion of a screw is realized through said moving part and pressure application to a melted polymer stored at the end of a barrel and fill-up of a cavity with polymer melt are realized by a movement of said screw, comprising:

deriving an estimate of injection pressure $\hat{x}_3$ and an estimate of injection velocity $\hat{x}_2$ which a high-gain observer outputs by using a screw position signal detected by a rotary encoder mounted on a servomotor axis and a motor current demand signal applied to said servomotor or an actual motor current signal as inputs and by executing at a constant time interval discrete-time arithmetic expressions wherein the equation (125) and the equation (128) are used, which are obtained by applying a standard method of forward rectangular rule to continuous-time calculation procedures which are derived from a mathematical model of an injection mechanism representing motion equations of said injection and pressure application mechanism and consisting of state equations wherein the equations (122) and (123) are used;

$$\dot{x} = Ax + \begin{bmatrix} 0 \\ \chi(x_2) + cu \\ \psi(x) \end{bmatrix} \quad A = \begin{bmatrix} 0 & a & 0 \\ 0 & 0 & b \\ 0 & 0 & 0 \end{bmatrix} \quad x = \begin{bmatrix} x_1 \\ x_2 \\ x_3 \end{bmatrix} \quad (122)$$

$$y = [1 \ 0 \ 0]x \quad (123)$$

$$\chi(x_2) = e\frac{x_2}{|x_2|}(h|x_2|^\gamma + p) \quad \psi(x) = \frac{d}{1-x_1}\{x_2 - f(x_3)\} \quad (124)$$

where $x_1$: State variable of screw position dimensionless made by maximum screw stroke, $x_2$: State variable of injection velocity dimensionless made by maximum injection velocity, $x_3$: State variable of injection pressure dimensionless made by maximum injection pressure, u: Input variable of motor current demand or actual motor current dimensionless made by motor current rating, y: Dimensionless output variable expressing measurable state variable $x_1$, a, b, c, d, e, h, p, γ: Constants of a mathematical model of an injection mechanism, $f(x_3)$: Function of dimensionless injection pressure $x_3$ determining dimensionless injection rate of polymer into a cavity, $\chi(x_2)$, $\psi(x)$: Nonlinear functions of equation (124)

$$\begin{bmatrix} \hat{\eta}_1(k+1) \\ \hat{\eta}_2(k+1) \end{bmatrix} = \quad (125)$$

$$(I_2 + \alpha A_0)\begin{bmatrix} \hat{\eta}_1(k) \\ \hat{\eta}_2(k) \end{bmatrix} + \alpha A_0 K_0 y(k) + \alpha \begin{bmatrix} \varepsilon^2 \chi(k) + \varepsilon^2 cu(k) \\ \varepsilon^3 \psi(k) \end{bmatrix}$$

$$A_0 = A_{22} - K_0 A_{12} \quad A_{12} = [a \ 0] \quad A_{22} = \begin{bmatrix} 0 & b \\ 0 & 0 \end{bmatrix} \quad K_0 = \begin{bmatrix} K_1 \\ K_2 \end{bmatrix} \quad \alpha = \frac{\Delta t}{\varepsilon} \quad (126)$$

$$\chi(k) = e\frac{\hat{x}_2(k)}{|\hat{x}_2(k)|}(h|\hat{x}_2(k)|^\gamma + p) \quad \psi(k) = \frac{d}{1-y(k)}\{\hat{x}_2(k) - f(\hat{x}_3(k))\} \quad (127)$$

where k: Discrete variable representing a discrete-time $t_k$ (k=0, 1, 2, . . . ), $\hat{\eta}_1(k)$, $\hat{\eta}_2(k)$: Estimates $\hat{\eta}_1(t_k)$, $\hat{\eta}_2(t_k)$ of new state variables $\eta_1$, $\eta_2$ introduced for estimating state variables $x_2$, $x_3$ at a discrete-time $t_k$, y(k) , u(k): y($t_k$), u($t_k$) at a discrete-time $t_k$, $\hat{x}_2(k)$, $\hat{x}_3(k)$: Estimates $\hat{x}_2(t_k)$, $\hat{x}_3(t_k)$ at a discrete-time $t_k$, $\chi(k)$, $\psi(k)$: $\chi(t_k)$, $\psi(t_k)$ at a discrete-time $t_k$, $I_2$: 2×2 unit matrix, Δt: Sampling period of a discrete-time high-gain observer,
ε: Positive parameter much smaller than 1 used in the high-gain observer, $K_1$, $K_2$: Gain constants of the high-gain observer which are decided so that matrix $A_0$ has conjugate complex eigenvalues with a negative real part $$\begin{bmatrix} \hat{x}_2(k) \\ \hat{x}_3(k) \end{bmatrix} = D^{-1} \begin{bmatrix} \hat{\eta}_1(k) \\ \hat{\eta}_2(k) \end{bmatrix} + D^{-1} K_0 y(k) \quad D = \begin{bmatrix} \varepsilon & 0 \\ 0 & \varepsilon^2 \end{bmatrix} \quad (128)$$

where $\hat{x}_2(k)$, $\hat{x}_3(k)$: Estimates $\hat{x}_2(t_k)$, $\hat{x}_3(t_k)$ of state variables $x_2$, $x_3$ at a discrete-time $t_k$ feeding said estimate of injection pressure and an injection pressure command signal fed by an injection pressure setting device to a subtractor;

deriving a difference signal between said injection pressure command signal and said estimate of injection pressure by using said subtractor;

feeding said difference signal to a pressure controller;

deriving said motor current demand signal by using said pressure controller so that said estimate of injection pressure follows said injection pressure command signal;

feeding said motor current demand signal to a motor controller; and controlling said servomotor by said motor controller so as to generate an actual motor torque corresponding to said motor current demand signal and to realize a given injection pressure.

3. A method for controlling pressure in an electric-motor driven injection molding machine having an injection and pressure application mechanism in which rotation of a servomotor is transferred to rotation of a ball screw through a reduction gear and rotation of said ball screw is converted to a linear motion of a nut of said ball screw and said nut drives a moving part and a linear motion of a screw is realized through said moving part and pressure application to a melted polymer stored at the end of a barrel and fill-up of a cavity with polymer melt are realized by a movement of said screw, comprising:

deriving an estimate of injection pressure $\hat{x}_3$, an estimate of injection velocity $\hat{x}_2$ and an estimate of screw position $\hat{x}_1$ which a high-gain observer outputs by using a screw position signal detected by a rotary encoder mounted on a servomotor axis, an injection velocity signal and a motor current demand signal applied to said servomotor or an actual motor current signal as inputs and by executing at a constant time interval discrete-time arithmetic expressions wherein the equation (132) and the equation (135) are used, which are obtained by applying a standard method of forward rectangular rule to continuous-time calculation procedures which are derived from a mathematical model of an injection mechanism representing motion equations of said injection and pressure application mechanism and consisting of state equations wherein the equations (129) and (130) are used;

$$\dot{x} = Ax + \begin{bmatrix} 0 \\ \chi(x_2) + cu \\ \psi(x) \end{bmatrix} \quad A = \begin{bmatrix} 0 & a & 0 \\ 0 & 0 & b \\ 0 & 0 & 0 \end{bmatrix} \quad x = \begin{bmatrix} x_1 \\ x_2 \\ x_3 \end{bmatrix} \quad (129)$$

$$y = \begin{bmatrix} y_1 \\ y_2 \end{bmatrix} = \begin{bmatrix} x_1 \\ x_2 \end{bmatrix} = Cx \quad C = \begin{bmatrix} 1 & 0 & 0 \\ 0 & 1 & 0 \end{bmatrix} \quad (130)$$

-continued $$\chi(x_2) = e \frac{x_2}{|x_2|}(h|x_2|^\gamma + p) \quad \psi(x) = \frac{d}{1-x_1}\{x_2 - f(x_3)\} \quad (131)$$

where $x_1$: State variable of screw position dimensionless made by maximum screw stroke, $x_2$: State variable of injection velocity dimensionless made by maximum injection velocity, $x_3$: State variable of injection pressure dimensionless made by maximum injection pressure, u: Input variable of motor current demand or actual motor current dimensionless made by motor current rating, $y_1$, $y_2$: Dimensionless output variables expressing measurable state variables $x_1$, $x_2$ respectively, a, b, c, d, e, h, p, $\gamma$: Constants of a mathematical model of an injection mechanism, $f(x_3)$: Function of dimensionless injection pressure $x_3$ determining dimensionless injection rate of polymer into a cavity, $\chi(x_2)$, $\psi(x)$: Nonlinear functions expressed by equation (131)

$$\begin{bmatrix} \hat{\eta}_1(k+1) \\ \hat{\eta}_2(k+1) \\ \hat{\eta}_3(k+1) \end{bmatrix} = \quad (132)$$

$$(I_3 + \alpha A_0)\begin{bmatrix} \hat{\eta}_1(k) \\ \hat{\eta}_2(k) \\ \hat{\eta}_3(k) \end{bmatrix} + \alpha K_0 \begin{bmatrix} y_1(k) \\ \varepsilon y_2(k) \end{bmatrix} + \alpha \begin{bmatrix} 0 \\ \varepsilon^2 \chi(k) + \varepsilon^2 cu(k) \\ \varepsilon^3 \psi(k) \end{bmatrix}$$

$$A_0 = A - K_0 C \quad K_0 = \begin{bmatrix} K_{11} & K_{12} \\ K_{21} & K_{22} \\ K_{31} & K_{32} \end{bmatrix} \quad \alpha = \frac{\Delta t}{\varepsilon} \quad (133)$$

$$\chi(k) = e\frac{y_2(k)}{|y_2(k)|}(h|y_2(k)|^\gamma + p) \quad \psi(k) = \frac{d}{1-y_1(k)}\{y_2(k) - f(\hat{x}_3(k))\} \quad (134)$$

where k: Discrete variable representing a discrete-time $t_k$ (k=0, 1, 2, . . . ), $\hat{\eta}_2(k)$, $\hat{\eta}_3(k)$: Estimated values $\hat{\eta}_1(t_k)$, $\hat{\eta}_2(t_k)$, $\hat{\eta}_3(t_k)$ at a discrete-time $t_k$ of new state variables $\eta_1$, $\eta_2$, $\eta_3$ introduced for estimating state varibles $x_1$, $x_2$, $x_3$, $y_1(k)$, $y_2(k)$, u(k): Values $y_1(t_k)$, $y_2(t_k)$, $u(t_k)$ at a discrete-time $t_k$ of output variables $y_1$, $y_2$ and input variable u, $\hat{x}_3(k)$: Estimated value $\hat{x}_3(t_k)$ at a discrete-time $t_k$ of state variable $x_3$, $\chi(k)$, $\psi(k)$: Function values $\chi(t_k)$, $\psi(t_k)$ at a discrete-time $t_k$ of nonlinear functions $\chi$, $\psi$, $I_3$: 3×3 unit matrix, $\Delta t$: Sampling period of a discrete-time high-gain observer, $\varepsilon$: Positive parameter much smaller than 1 used in the high-gain observer, $K_0$: Gain matrix of the high-gain observer which is decided so that matrix $A_0$ has conjugate complex eigenvalues with a negative real part and a negative real eigenvalue $$\begin{bmatrix} \hat{x}_1(k) \\ \hat{x}_2(k) \\ \hat{x}_3(k) \end{bmatrix} = D^{-1} \begin{bmatrix} \hat{\eta}_1(k) \\ \hat{\eta}_2(k) \\ \hat{\eta}_3(k) \end{bmatrix} \quad D = \begin{bmatrix} 1 & 0 & 0 \\ 0 & \varepsilon & 0 \\ 0 & 0 & \varepsilon^2 \end{bmatrix} \quad (135)$$

where $\hat{x}_1(k)$, $\hat{x}_2(k)$, $\hat{x}_3(k)$: Estimated values $\hat{x}_1(t_k)$, $\hat{x}_2(t_k)$, $\hat{x}_3(t_k)$ at a discrete-time $t_k$ of state variables $x_1$, $x_2$, $x_3$ feeding said estimate of injection pressure and an injection pressure command signal fed by an injection pressure setting device to a subtractor;

deriving a difference signal between said injection pressure command signal and said estimate of injection pressure by using said subtractor;

feeding said difference signal to a pressure controller;
deriving a motor current demand signal by using said pressure controller so that said estimate of injection pressure follows said injection pressure command signal;
feeding said motor current demand signal to a motor controller; and
controlling said servomotor by said motor controller so as to generate an actual motor torque corresponding to said motor current demand signal and to realize a given injection pressure.

* * * * *